United States Patent
Kim et al.

(10) Patent No.: US 11,676,180 B1
(45) Date of Patent: Jun. 13, 2023

(54) AI-BASED CAMPAIGN AND CREATIVE TARGET SEGMENT RECOMMENDATION ON SHARED AND PERSONAL DEVICES

(71) Applicant: Samsung Electronics Co., Ltd., Suwon-si (KR)

(72) Inventors: Hong-Hoe Kim, Aliso Viejo, CA (US); Tomasz J. Palczewski, Danville, CA (US); Yingnan Zhu, Irvine, CA (US); Xiangyuan Zhao, Irvine, CA (US); Hari Babu Nayar, Hayward, CA (US); Chaitanya Praveen Pratury, Mountain House, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/937,318

(22) Filed: Sep. 30, 2022

Related U.S. Application Data

(60) Provisional application No. 63/395,684, filed on Aug. 5, 2022.

(51) Int. Cl.
*G06Q 30/02* (2023.01)
*G06Q 30/0251* (2023.01)
*G06Q 30/0242* (2023.01)

(52) U.S. Cl.
CPC ..... *G06Q 30/0269* (2013.01); *G06Q 30/0242* (2013.01)

(58) Field of Classification Search
CPC ................ G06Q 30/0269; G06Q 30/0242
See application file for complete search history.

(56) References Cited

U.S. PATENT DOCUMENTS

| | | | |
|---|---|---|---|
| 8,671,424 B2 | 3/2014 | Skinner | |
| 9,241,187 B2 | 1/2016 | Ricci | |
| 10,244,286 B1* | 3/2019 | Jia | H04N 21/44224 |
| 10,467,307 B1* | 11/2019 | Chanda | G06F 16/248 |
| 11,019,385 B2 | 5/2021 | Kim et al. | |
| 11,068,285 B2* | 7/2021 | Sheoran | G06F 3/048 |
| 11,257,596 B2 | 2/2022 | Cho et al. | |
| 11,373,230 B1* | 6/2022 | Johnson | G06F 16/355 |
| 11,526,333 B2* | 12/2022 | Hunter | G06F 9/5038 |
| 11,551,239 B2* | 1/2023 | Jain | G06Q 30/01 |

(Continued)

OTHER PUBLICATIONS

Chen, Elsevier, 2020, pp. 1-21.*

(Continued)

*Primary Examiner* — Michael I Ezewoko

(57) ABSTRACT

A method includes obtaining (i) device data associated with multiple electronic devices and (ii) advertisement data associated with one or more advertisement campaigns. The method also includes identifying first features and second features, where the first features correspond to the device data and the second features correspond to the advertisement data. The method further includes generating a graph relating usage history of the multiple electronic devices and one or more advertisement genres. The method also includes identifying a specified electronic device from among the multiple electronic devices and an advertisement segment from among the one or more advertisement campaigns using the first features, the second features, and the graph. In addition, the method includes providing the advertisement segment to the specified electronic device.

20 Claims, 27 Drawing Sheets

(56) References Cited

U.S. PATENT DOCUMENTS

| | | |
|---|---|---|
| 2007/0239538 A1 | 10/2007 | Misra |
| 2009/0164395 A1* | 6/2009 | Heck .................... G06F 16/954 706/16 |
| 2011/0153377 A1* | 6/2011 | Novikov ............... G06Q 30/02 705/14.42 |
| 2013/0132874 A1* | 5/2013 | He ..................... G06F 3/04817 715/765 |
| 2013/0151332 A1 | 6/2013 | Yan et al. |
| 2013/0288222 A1* | 10/2013 | Stacy .................... G09B 5/00 434/362 |
| 2014/0169681 A1* | 6/2014 | Drake ............. G06V 30/18162 382/197 |
| 2014/0195475 A1* | 7/2014 | Levchuk ................. G06N 7/01 706/52 |
| 2014/0244427 A1* | 8/2014 | Huang ............... G06Q 30/0631 705/26.7 |
| 2015/0242750 A1* | 8/2015 | Anderson .......... G06Q 30/0631 706/50 |
| 2015/0262205 A1* | 9/2015 | Theocharous ..... G06Q 30/0202 705/7.31 |
| 2015/0269609 A1* | 9/2015 | Mehanian .......... G06Q 30/0254 705/14.45 |
| 2016/0078456 A1* | 3/2016 | Chakraborty ...... G06Q 30/0204 705/7.31 |
| 2017/0213248 A1* | 7/2017 | Jing .......................... G06T 7/30 |
| 2018/0174070 A1* | 6/2018 | Hoffman ................ G06T 11/00 |
| 2018/0225379 A1* | 8/2018 | Bhadury ................ G06F 7/026 |
| 2018/0342004 A1* | 11/2018 | Yom-Tov ............... G06N 5/022 |
| 2019/0035431 A1* | 1/2019 | Attorre .................. G11B 27/34 |
| 2019/0057154 A1* | 2/2019 | Philip ................. G06F 16/9535 |
| 2019/0311279 A1* | 10/2019 | Sinha ....................... G06N 7/01 |
| 2019/0373297 A1* | 12/2019 | Sarkhel ............ H04N 21/25841 |
| 2020/0118145 A1* | 4/2020 | Jain ........................ G06Q 30/02 |
| 2020/0285960 A1* | 9/2020 | Zhao ................. G06Q 30/0205 |
| 2020/0286112 A1* | 9/2020 | Zhou ...................... G06N 3/084 |
| 2020/0334545 A1* | 10/2020 | Sinha ....................... G06N 5/02 |
| 2021/0089598 A1* | 3/2021 | Jeong ................. G06F 16/9024 |
| 2021/0097384 A1* | 4/2021 | Jain ......................... G06N 3/08 |

OTHER PUBLICATIONS

Zhang, Apr. 2021, pp. 14-35.*
Zhou, Elsevier, 2020, pp. 57-81.*
Wang et al., "Neural Graph Collaborative Filtering," Proceedings of the 42nd International ACM SIGIR Conference on Research and Development in Information Retrieval, Jul. 2019, 10 pages.
Wang et al., "Social Influence Does Matter: User Action Prediction for In-Feed Advertising," Thirty-Fourth AAAI Conference on Artificial Intelligence, Feb. 2020, 8 pages.
Zhao et al., "DEAR: Deep Reinforcement Learning for Online Advertising Impression in Recommender Systems," Thirty-Fifth AAAI Conference on Artificial Intelligence, Feb. 2021, 9 pages.

* cited by examiner

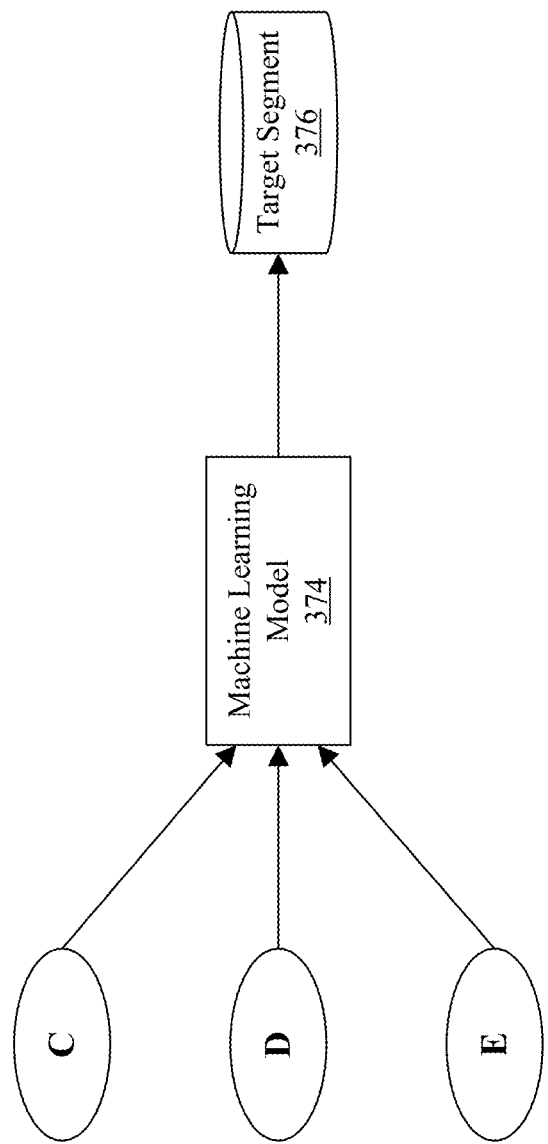

AI-BASED CAMPAIGN AND CREATIVE TARGET SEGMENT RECOMMENDATION ON SHARED AND PERSONAL DEVICES

CROSS-REFERENCE TO RELATED APPLICATION AND PRIORITY CLAIM

This application claims priority under 35 U.S.C. § 119(e) to U.S. Provisional Patent Application No. 63/395,684 filed on Aug. 5, 2022. This provisional patent application is hereby incorporated by reference in its entirety.

TECHNICAL FIELD

This disclosure relates generally to artificial intelligence (AI) systems. More specifically, this disclosure relates to AI-based campaign and creative target segment recommendation on shared and personal devices.

BACKGROUND

The use of electronic devices has greatly expanded largely due to their usability, convenience, computing power, and the like. For example, various electronic devices support functions such as digital media playback, game play, electronic book (e-book) reading, digital image capture, calendar scheduling, wireless communications, and Internet searching. Various functions produce usage data that can be used to understand usage behaviors and patterns of users for sales and marketing purposes. The availability and use of information about users or other potential customers can be important for success in many businesses. For instance, information regarding household demographics can be useful in many fields. As particular examples, marketing and advertising placement are frequently based on age and gender information, so it is helpful to precisely determine attributes of people who reside in various households. Some household demographic information can be inferred from usage data collected by certain devices like connected or smart televisions. However, the collection of precise demographic information from electronic devices can be difficult for many reasons, including privacy concerns, difficulties of instance-level data collection, and cost constraints.

SUMMARY

This disclosure relates to artificial intelligence (AI)-based campaign and creative target segment recommendation on shared and personal devices.

In a first embodiment, a method includes obtaining (i) device data associated with multiple electronic devices and (ii) advertisement data associated with one or more advertisement campaigns. The method also includes identifying first features and second features, where the first features correspond to the device data and the second features correspond to the advertisement data. The method further includes generating a graph relating usage history of the multiple electronic devices and one or more advertisement genres. The method also includes identifying a specified electronic device from among the multiple electronic devices and an advertisement segment from among the one or more advertisement campaigns using the first features, the second features, and the graph. In addition, the method includes providing the advertisement segment to the specified electronic device.

In a second embodiment, an electronic device includes at least one processing device configured to obtain (i) device data associated with multiple electronic devices and (ii) advertisement data associated with one or more advertisement campaigns. The at least one processing device is also configured to identify first features and second features, where the first features correspond to the device data and the second features correspond to the advertisement data. The at least one processing device is further configured to generate a graph relating usage history of the multiple electronic devices and one or more advertisement genres. The at least one processing device is also configured to identify a specified electronic device from among the multiple electronic devices and an advertisement segment from among the one or more advertisement campaigns using the first features, the second features, and the graph. In addition, the at least one processing device is configured to provide the advertisement segment to the specified electronic device.

In a third embodiment, a non-transitory machine-readable medium contains instructions that when executed cause at least one processor of an electronic device to obtain (i) device data associated with multiple electronic devices and (ii) advertisement data associated with one or more advertisement campaigns. The non-transitory machine-readable medium also contains instructions that when executed cause the at least one processor to identify first features and second features, where the first features correspond to the device data and the second features correspond to the advertisement data. The non-transitory machine-readable medium further contains instructions that when executed cause the at least one processor to generate a graph relating usage history of the multiple electronic devices and one or more advertisement genres. The non-transitory machine-readable medium also contains instructions that when executed cause the at least one processor to identify a specified electronic device from among the multiple electronic devices and an advertisement segment from among the one or more advertisement campaigns using the first features, the second features, and the graph. In addition, the non-transitory machine-readable medium contains instructions that when executed cause the at least one processor to provide the advertisement segment to the specified electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" in accordance with this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A through 3D illustrate an example process for segment generation in accordance with this disclosure;

DETAILED DESCRIPTION

Figure 1:
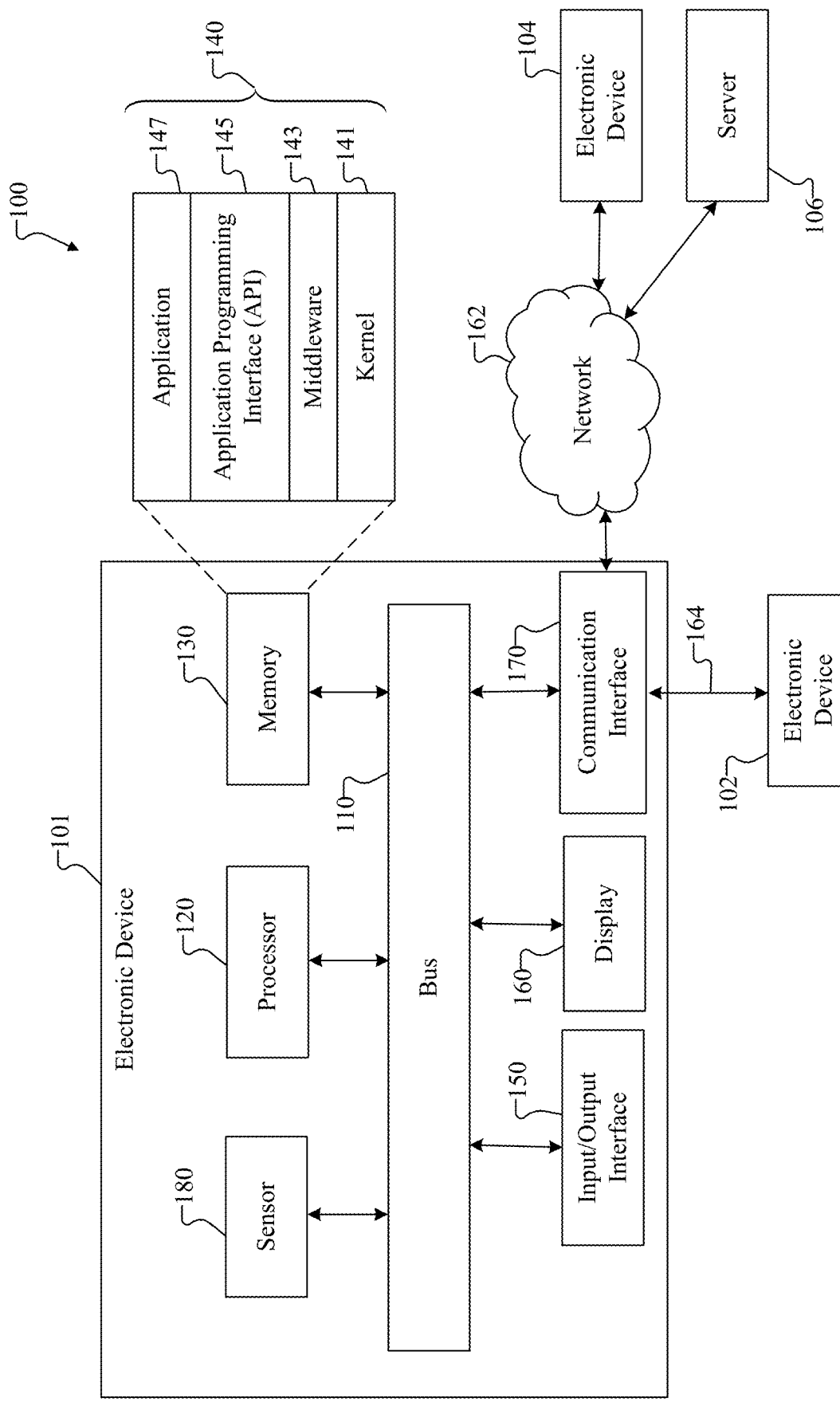
FIG. 1 illustrates an example network configuration including an electronic device in accordance with this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

As noted above, the use of electronic devices has greatly expanded largely due to their usability, convenience, computing power, and the like. For example, various electronic devices support functions such as digital media playback, game play, electronic book (e-book) reading, digital image capture, calendar scheduling, wireless communications, and Internet searching. Various functions produce usage data that can be used to understand usage behaviors and patterns of users for sales and marketing purposes. The availability and use of information about users or other potential customers can be important for success in many businesses. For instance, information regarding household demographics can be useful in many fields. As particular examples, marketing and advertising placement are frequently based on age and gender information, so it is helpful to precisely determine attributes of people who reside in various households. Some household demographic information can be inferred from usage data collected by certain devices like connected or smart televisions. However, the collection of precise demographic information from electronic devices can be difficult for many reasons, including privacy concerns, difficulties of instance-level data collection, and cost constraints. Additionally, the amount of usage data is increasing due to the larger number of electronic devices in the marketplace. In addition, certain devices can be shared between users within a household, such as a smart television. This sharing of devices can make it even more difficult to identify precise demographic information. As such, understanding usage behaviors from usage data of users is becoming more difficult and more expensive.

This disclosure describes various systems and methods for generating insights that can be used for targeting various advertisements to various electronic devices. For example, this disclosure describes various systems and methods for selecting various advertisements to be provided to various electronic devices based on both personal device and shared device usage history and demographic information, as well as advertisement information. A personal device refers to an electronic device that is likely used by a single individual (such as a smartphone), while a shared device refers to a device that is likely shared by multiple users within a household (such as a smart television or a gaming console).

Some advertisement segment generation approaches use either personal devices or shared devices separately while neglecting the correlation between them. For instance, some television campaign segments are generated using television usage data alone while disregarding information from personal devices. Utilizing information from both personal electronic devices and shared electronic devices can provide insights for targeting certain advertisements to certain devices based on demographic and usage history. The disclosed embodiments help to ensure high-precision predictions related to providing selected advertisements to selected electronic devices. Such improvements increase the understanding of user demographics based on content consumption history and, as a final result, deliver more precise advertisements to tailored audiences. Note that while some of the embodiments discussed below are described in the context of television, smartphone, and demographic information, this is merely one example, and it will be understood that the principles of this disclosure may be implemented in any number of other suitable contexts.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may be used to present advertisements to one or more potential viewers. The processor 120 may also optionally be used to identify the advertisements to be presented to the one or more potential viewers.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications related to the identification or presentation of advertisements. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. For example, the plurality of applications 147 can include one or more applications that obtain device data and/or advertisement data, identify features of the device data and/or advertisement data, generate graphs relating to usage history of multiple electronic devices and one or more advertisement genres, identify an advertisement segment using the identified features and the graphs, and provide the advertisement segment to a specified electronic device. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to identify advertisements to be presented to potential viewers and to provide the advertisements to multiple electronic devices, such as the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
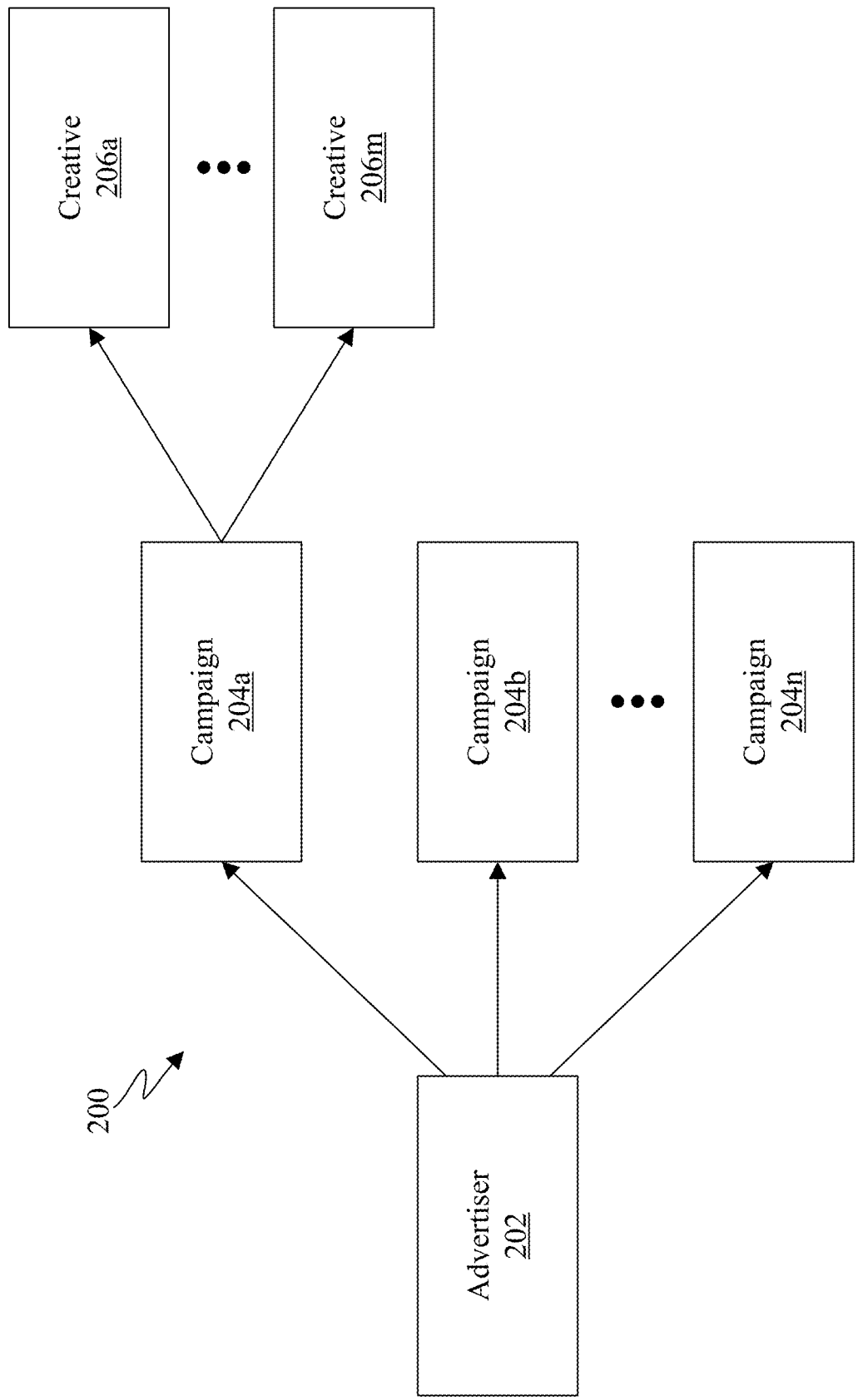
FIG. 2 illustrates an example diagram describing relationships between an advertiser, campaigns, and creatives in accordance with this disclosure.

FIG. 2 illustrates an example diagram 200 describing relationships between an advertiser, campaigns, and creatives in accordance with this disclosure. As shown in FIG. 2, an advertiser 202 can have multiple advertisement campaigns 204a-204n, where each advertisement campaign 204a-204n is generally associated with one or more products or services. Each campaign 204a-204n can have or involve the use of one or more creatives 206a-206m, where each creative 206a-206m may represent an advertisement (such as a video-based advertisement, a text-based advertisement, or both).

A company or other organization can offer one or more products or services, such as to the general public, and each product or service can be associated with an advertiser 202. For example, an advertiser 202 can be a streaming service or other service that can provide specific advertisements to specific end user devices (like appliances, computing devices, and vehicles). For a certain advertiser 202, such as a streaming service, each campaign 204a-204n may be directed towards a particular channel. For instance, the campaign 204a can be directed towards THE MOVIE CHANNEL, the campaign 204b can be directed towards ABC NEWS, and the like. Each creative 206a-206m can include any suitable content related to the product(s) or service(s) being advertised, such as a long video advertisement, a short video advertisement, or a text advertisement. In some cases, the advertiser 202 may represent the organization itself, and the organization can create or manage its own campaigns 204a-204n and its own creatives 206a-206m.

Embodiments of this disclosure take into consideration the fact that each campaign 204a-204n may have a relatively-short lifespan (such as two months or less) and a creative 206a-206m may have an even shorter lifespan (such as a week or less). Additionally, in many cases, a campaign 204a-204n is non-recurring, which means that it will occur once and not be repeated. As such, it is difficult to generate target segments (identifications of advertisements to be provided in the form of creatives 206a-206m to potential viewers) due to the sparseness of information. This creates a cold-start problem, which occurs due to the difficulty of targeting a particular advertisement to a particular device or user at the start of a creative 206a-206m or campaign 204a-204n. To resolve the cold-start problem and other issues, this disclosure describes various systems and methods that identify particular users and devices that will likely engage with a particular advertisement.

To identify users and devices that will likely engage with particular advertisements, a server 106 or other component can generate features for a device (such as an electronic device 101), features for a user (such as a user of the electronic device 101), features for an advertisement (such as a creative 206a-206m), and metadata. As described above, a user can have one or more personal electronic devices, and one or more electronic devices can be shared by multiple users in a household. In some cases, all of the electronic devices associated with a user can be expressed as follows.

$$\text{User}_i = \{\text{set of shared devices, set of personal devices}\} \quad (1)$$

Here, i represents the $i^{th}$ user in a household, where that user is associated with a set of one or more shared devices and a set of one or more personal devices. A device feature relates usage of a particular shared or personal device to one or more aspects of the device itself. For example, a device feature can be expressed as follows.

$$F_{device_i} = F(\text{usage of device}_i, \text{metadata of device}_i) \quad (2)$$

Here, $F_{device_i}$ represents the device feature for the $i^{th}$ device, where the device feature is based on usage of the $i^{th}$ device and metadata of the $i^{th}$ device. In some cases, the usage of a device can be expressed as a usage history, such as a sequence of user interactions with a particular device (like app/content identifiers invoked or viewed on a device and a corresponding timestamp for each). The metadata for a device may identify information such as a browser used on the device, an operating system of the device, and the like. A user feature relates to one or more aspects of a user. For instance, a user feature can be expressed as follows.

$$F_{user_i} = F(F_{S_1}, \ldots, F_{S_N}, F_{P_1}, \ldots, F_{P_M}, \text{metadata of User}_i) \quad (3)$$

Here, $F_{user_i}$ represents the user feature for the $i^{th}$ user, where the user feature is based on one or more device features for one or more shared devices ($F_{S_1}, F_{S_N}$), one or more device features for one or more personal devices ($F_{P_1}, F_{P_M}$), and metadata of the user. The metadata for a user may identify information such as the user's gender, age, location, and the like.

As shown in FIG. 2, an advertiser 202 can have one or more campaigns 204a-204n. In some cases, each of the advertisers 202 may be represented as follows.

$$\text{Advertiser}_i = \{\text{Campaign}_1, \ldots, \text{Campaign}_N, \text{metadata of Advertiser}_i\} \quad (4)$$

Here, Advertiser$_i$ represents the $i^{th}$ advertiser 202, where this advertiser is defined based on the advertiser's campaign(s) and metadata for the advertiser. The metadata for the advertiser may identify information such as a bidding price, a description of an advertisement, and the like. Also, as shown in FIG. 2, each campaign 204a-204n can have one or more creatives 206a-206m. In some cases, each campaign 204a-204n may be represented as follows.

$$\text{Campaign}_i = \{\text{Creative}_1, \ldots, \text{Creative}_M, \text{metadata of Campaign}_i\} \quad (5)$$

Here, Campaign$_i$ represents the $i^{th}$ campaign 204a-204n, where this campaign is defined based on the campaign's creative(s) and metadata for the campaign. The metadata for the campaign may identify information such as a campaign type (like video, text, or both), a length of a campaign, and the like.

A creative feature can be defined to represent each creative 206a-206m. For example, a creative feature may be expressed as follows.

$$F_{Creative_i} = F(\text{Interactive history of Creative}_i, \text{metadata of Creative}_i) \quad (6)$$

Here, $F_{Creative_i}$ represents the creative feature for the $i^{th}$ creative 206a-206m and is based on one or more users' interactions (if any) with the creative 206a-206m and metadata of the creative. Similarly, a campaign feature can be defined to represent each campaign 204a-204n. For instance, a campaign feature may be expressed as follows.

$$F_{campaign_i} = F(F_{Creative_1}, \ldots, F_{creative_N}, \text{metadata of Campaign}_i) \quad (7)$$

Here, $F_{campaign_i}$ represents the campaign feature for the $i^{th}$ campaign 204a-204n and is based on the creative features for the creatives 206a-206m of the campaign and metadata associated with the campaign. In addition, an advertiser feature can be defined to represent each advertiser 202. For example, an advertiser feature may be expressed as follows.

$$F_{Advertiser_i} = F(F_{campaign_1}, \ldots, F_{campaign_M}, \text{metadata of Advertiser}_i) \quad (8)$$

Here, $F_{Advertiser_i}$ represents the advertiser feature for the $i^{th}$ advertiser 202 and is based on the campaign features for the campaigns 204a-204n of the advertiser and metadata associated with the advertiser.

The various features defined above can be used to predict whether a particular user or device may or may not favor a particular advertiser 202, campaign 204a-204n, or creative 206a-206m. For example, Equation (9) may be used to define how to predict whether a user or device (User$_i$ or Device$_i$) will favor an advertiser (Advertiser$_i$), a campaign (Campaign$_i$), and/or a creative (Creative$_i$) based on their associated features.

$$\text{Segment } S = \prod_{i=1}^{N} F(X, Y) \geq \text{Threshold} \quad (9)$$

Here, X represents a user or a device; Y represents an advertiser, a campaign, or a creative; and N represents a number of devices or users. One goal of Equation (9) is to identify a function that maximizes a metric value argmax$_F$-Metric(S). As a particular example, Equation (9) may be used to identify a function that maximizes a click-through rate (CTR), which corresponds to a ratio of (i) the number of users who clicked on a specific advertisement and (ii) the number of total users who viewed a webpage that included the advertisement. CTR is a metric that indicates the success of an online advertising campaign.

Although FIG. 2 illustrates one example of a diagram 200 describing relationships between an advertiser, campaigns, and creatives, various changes may be made to FIG. 2. For example, an advertiser can have any number of campaigns, and each campaign can have any number of creatives.

FIGS. 3A through 3D illustrate an example process 300 for segment generation in accordance with this disclosure. For ease of explanation, the process 300 of FIGS. 3A through 3D may be described as being performed by the server 106 in the network configuration 100 of FIG. 1. However, the process 300 of FIGS. 3A through 3D may be performed by any other suitable device(s) and in any other suitable system(s), such as when performed by the electronic device 101.

As shown in FIGS. 3A through 3D, the process 300 is generally used to identify (from among multiple devices and multiple advertisements) one or more devices that are more likely to interact with one or more of the advertisements. The process 300 here can be used to generate advertisement segments (such as collections of one or more creatives) based on one or more combinations of personal device data and shared device data. In some embodiments, advertisements can be segmented by individual, device, or family/group and can be segmented by advertiser, campaign, and creative. Here, lower-level information can be associated with at least one creative or campaign, while upper-level information can be associated with at least one campaign or advertiser. Also, in some embodiments, the process 300 can be at least partially implemented using one or more deep neural network model architectures or other machine learning model architectures. The machine learning model architecture may include an aggregation layer that generates at least one feature and at least one taste for at least one of an individual, a family or other group, an advertiser, or a campaign.

Figure 4:
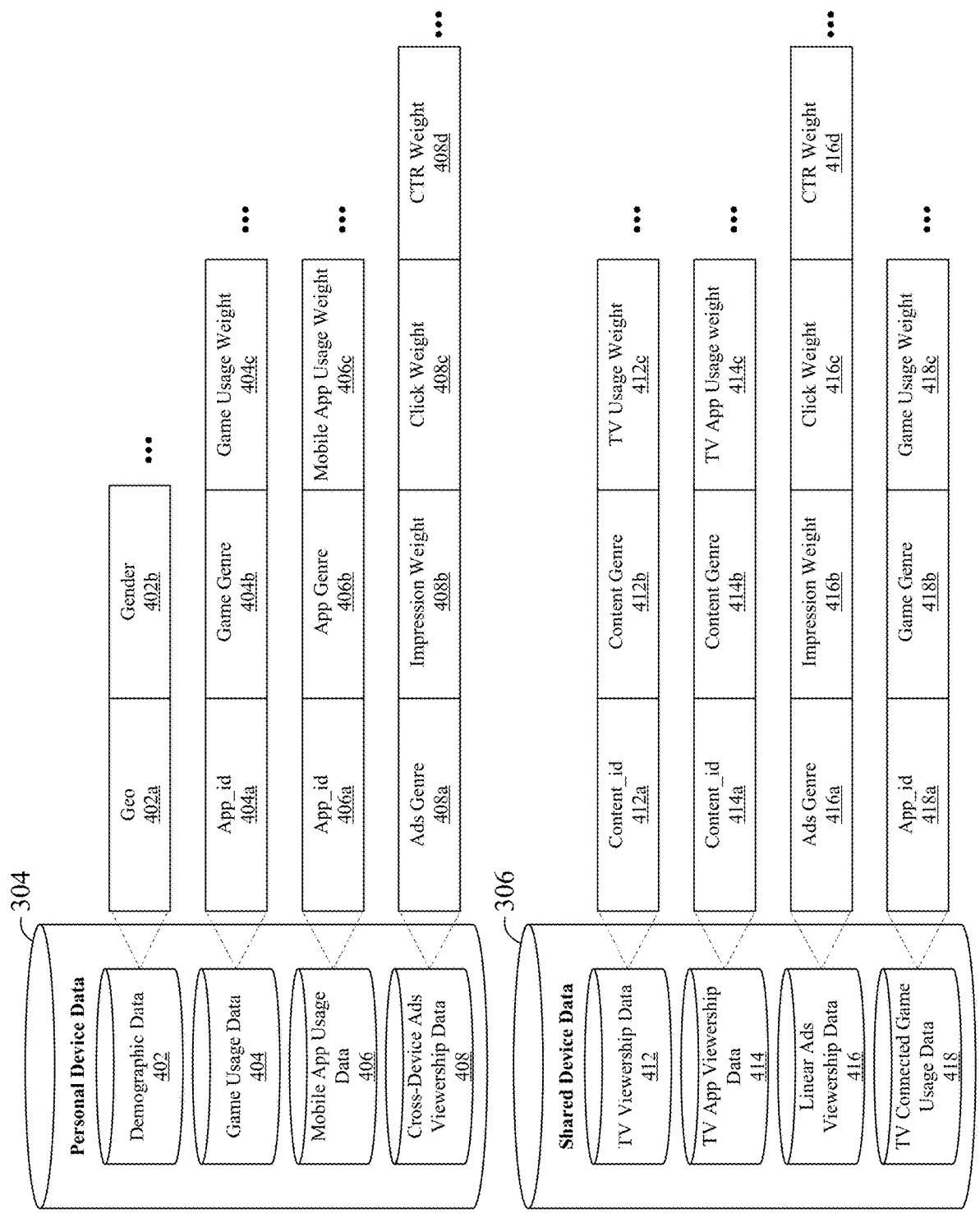
FIG. 4 illustrates example personal and shared device data that may be used in the process of FIGS. 3A through 3D in accordance with this disclosure.

In this example, user and device data 302, personal device data 304, and shared device data 306 are organized into personal device usage data 308a and shared device usage data 308b. The data 302 includes information relating each of multiple electronic devices to a particular user or set of users. For example, the data 302 may indicate which device or devices belong to a certain user and which device or devices are shared with multiple users in a household. The personal device data 304 includes information related to personal electronic devices, and the shared device data 306 includes information related to shared electronic devices. Examples of the types of information that may be included in the personal device data 304 and the shared device data 306 are shown in FIG. 4 and described below.

The personal device usage data 308a represents usage information for all of the personal electronic devices organized by user and by device. For example, the personal device usage data 308a can include personal device usage data 310a associated with a specific user or member. The personal device usage data 310a includes personal device usage data 312a-312k for k personal electronic devices used by the specific user. There can be n sets of personal device usage data 310a-310n for n different users, where each set of personal device usage data 310a-310n includes usage data for that user's personal electronic devices. The shared device usage data 308b represents usage information for all of the shared electronic devices organized by device. For instance, the shared device usage data 308b can include shared device usage data 314a associated with a specific shared electronic device. There can be m sets of shared device usage data 314a-314m for m different shared devices.

The personal device usage data 308a and the shared device usage data 308b are provided to a device feature generator 316, which generally operates to produce device features by encoding the personal device usage data 308a and the shared device usage data 308b. For example, the device feature generator 316 may process the usage data 308a-308b in order to generate feature vectors that are used to represent the usage data 308a-308b for various electronic devices in a feature space. The device feature generator 316 can use any suitable technique to generate the device features representing the usage data 308a-308b, such as by using an encoding technique (like word2vec, OneHot, or the like) to generate the device features. The device feature generator 316 here produces personal device features 330a and shared device features 330b.

The personal device features 330a represent features associated with personal electronic devices organized by user and by device. For example, the personal device features 330a can include personal device features 332a associated with a specific user or member. The personal device features 332a include personal device features 334a-334k for k personal electronic devices used by the specific user. There can be n sets of personal device features 332a-332n for n different users, where each set of personal device features 332a-332n includes features for that user's personal electronic devices. The shared device features 330b represent features associated with shared electronic devices organized by device. For instance, the shared device features 330b can include shared device features 336a associated with a specific shared electronic device. There can be m sets of shared device features 336a-336m for m different shared devices.

The personal device features 330a and the shared device features 330b are provided to an aggregation layer 338a, which generally operates to aggregate the features and generate member personal device features 340a and group shared device features 340b. The member personal device features 340a include personal device features 342a-342n for different users, where each set of personal device features 342a-342n includes an aggregation of the device features for all personal devices of a single user (as aggregated by the aggregation layer 338a). The group shared device features 340b include an aggregation of the device features for all shared devices of a group of users (as aggregated by the aggregation layer 338a). In some cases, the group of users here can represent users in a family or other household. An aggregation layer 338b can generally operate to aggregate the personal device features 342a-342n and generate group personal device features 344, which include an aggregation of the device features for all personal devices of the group of users. The features 330a, 340a, 340b, and 344 can be combined and used as a combined set of device/user features 346, which can represent the features of all users and all devices.

Figure 3A:
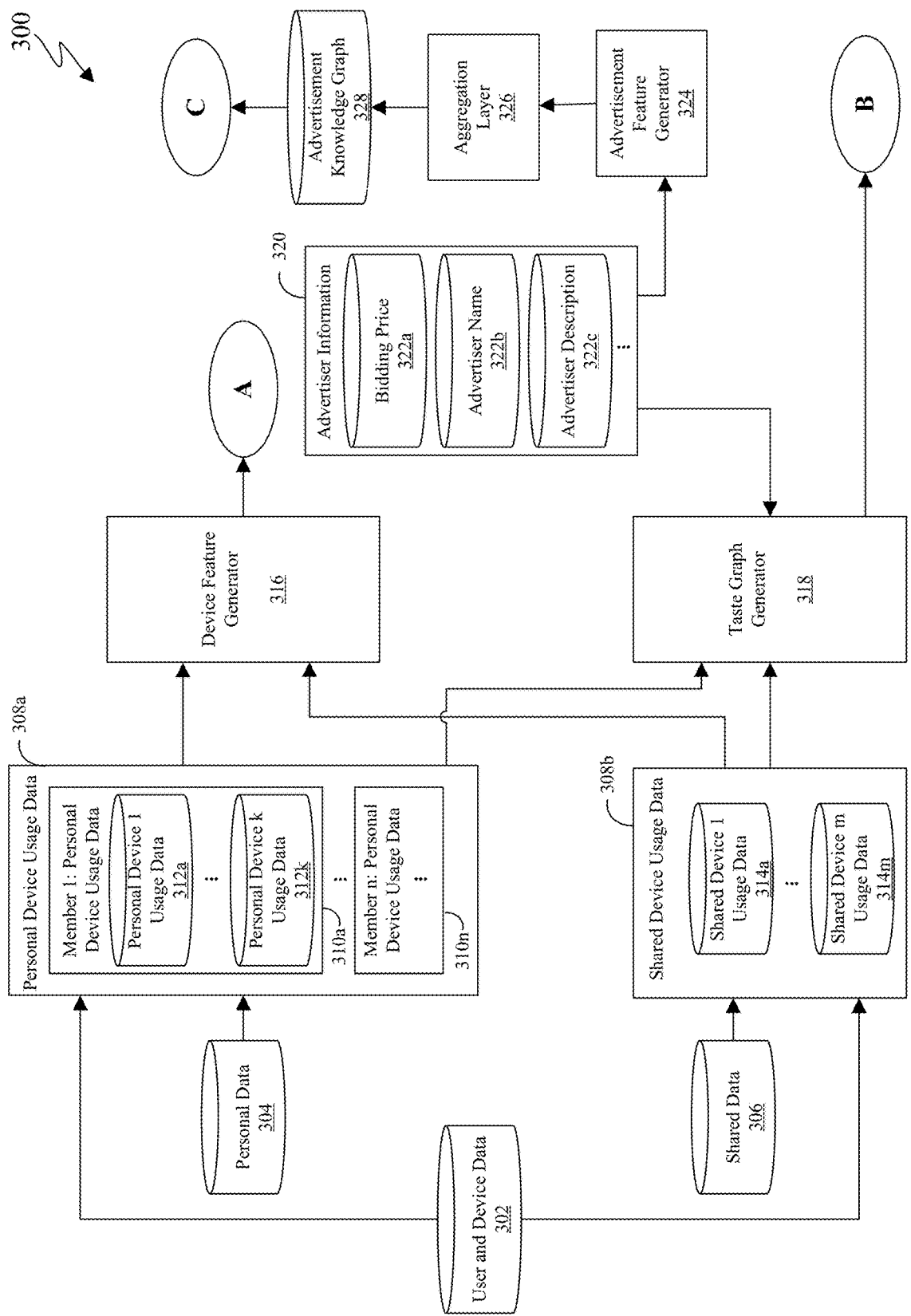

Advertiser information 320 in FIG. 3A includes various information related to one or more advertisers 202, such as bidding prices 322a, advertiser names 322b, advertiser descriptions 322c, and the like. The advertiser information 320 is provided to an advertisement feature generator 324, which generally operates to produce features from the advertiser information 320 in order to generate advertisement features. For example, the advertisement feature generator 324 may process the advertiser information 320 in order to produce feature vectors that are used to represent the advertiser information 320 for various advertisers in a feature space. The advertisement feature generator 324 can use any suitable technique to generate the advertisement features representing the advertiser information 320. The advertisement features are provided to an aggregation layer 326, which generally operates to aggregate the features and generate an advertisement knowledge graph 328 that contains or represents the advertisement features. In some cases, the aggregation layer 326 may be the same as or similar to the aggregation layers 338a-338b.

The advertiser information 320, the personal device usage data 308a, and the shared device usage data 308b are also provided to a taste graph generator 318, which generally operates to identify relationships between users, devices (shared and personal), and advertisements based on usage history. In other words, the taste graph generator 318 can generate information identifying interactions between users/devices and advertisements. The taste graph generator 318 here is used to generate an advertisement taste vector 368, personal device tastes 350a, and shared device tastes 350b as shown in FIG. 3C. The advertisement taste vector 368 represents a vector corresponding to the advertiser information 320. The personal device tastes 350a represent tastes (preferences) associated with individual users organized by user and by device. For example, the personal device tastes 350a can include personal device tastes 352a associated with a specific user or member. The personal device tastes 352a include personal device taste vectors 354a-354k for k personal electronic devices used by the specific user. There can be n sets of personal device tastes 352a-352n for n different users, where each set of personal device tastes 352a-352n includes taste vectors for that user's personal electronic devices. The shared device tastes 350b represent preferences for all of the shared electronic devices organized by device, where these preferences represent preferences shared by multiple users in a family or other household. For instance, the shared device tastes 350b can include shared device taste vectors 356a-356m associated with m specific shared electronic devices. Each taste vector here can represent interactions between users/devices and advertisements in a feature space and can be generated in any suitable manner.

The personal device tastes 350a and the shared device tastes 350b are provided to an aggregation layer 358, which generally operates to aggregate the taste vectors and generate member personal device taste vectors 360a and group shared device taste vectors 360b. The member personal device taste vectors 360a include personal device taste vectors 362a-362n for different users, where each personal device taste vector 362a-362n includes an aggregation of the taste vectors for all personal devices of a single user (as aggregated by the aggregation layer 358). The group shared device taste vectors 360b include an aggregation of the taste vectors for all shared devices of a group of users (as aggregated by the aggregation layer 358). An aggregation layer 364 can generally operate to aggregate the personal device taste vectors 362a-362n and generate group personal device taste vectors 366, which include an aggregation of the taste vectors for all personal devices of the group of users.

The taste vectors 354a-354k, 362a-362n, 360b, 366, 368 can be provided to a taste match layer operation 370. The taste match layer operation 370 generally operates to generate taste match scores 372, where each taste match score 372 indicates whether a genre taste of a specific user or device is similar to a specified advertisement. For example, a higher taste match score 372 may indicate that a specific user or device is more likely to view a specified advertisement favorably based on the genre preferences of the user/device, and a lower taste match score 372 may indicate that a specific user or device is less likely to view the specified advertisement favorably based on the genre preferences of the user/device.

The advertisement knowledge graph 328, the device/user features 346, and the taste match scores 372 are provided to a machine learning model 374 as shown in FIG. 3D. The machine learning model 374 represents a trained machine learning model that has been trained to predict (for a given device or user) whether the user may like a given campaign 204a-204n or creative 206a-206m. The machine learning model 374 may include a deep neural network or other suitable machine learning model architecture. The machine learning model 374 may also be trained in any suitable manner, such as by providing training data (like training advertisement knowledge graphs, training device/user features, and training taste match scores) and ground truths (known desired outputs) and modifying the machine learning model architecture until the machine learning model produces outputs that match or closely match the ground truths (at least to within a specified degree of accuracy).

In this example, the output of the machine learning model 374 represents at least one target segment 376. The at least one target segment 376 can indicate at least one particular campaign 204a-204n or creative 206a-206m that a particular device or a particular user may like. For example, the machine learning model 374 may perform device-level targeting to determine whether a user associated with a specific device would like a particular advertisement campaign 204a-204n or creative 206a-206m. To perform device-level targeting, the machine learning model 374 may obtain personal device features 334a and personal device tastes 354a for a specific device, along with the shared device features 330b, group shared device taste vector 360b, taste match score 372, and advertisement knowledge graph 328. The machine learning model 374 can use this information to estimate whether a user of the specific device would probably like an advertisement campaign 204a-204n or creative 206a-206m.

As another example, the machine learning model 374 can perform individual-level targeting to determine whether a specific user would like a particular advertisement campaign 204a-204n or creative 206a-206m. To perform individual-level targeting, the machine learning model 374 may obtain personal device features 332a that include features of each device associated with the particular user and personal device tastes 352a that include the tastes/preferences for each device associated with the particular user. Using this information along with shared device features 330b, group shared device taste vector 360b, taste match score 372, and advertisement knowledge graph 328, the machine learning model 374 can estimate whether the particular user would probably like an advertisement campaign 204a-204n or creative 206a-206m.

As yet another example, the machine learning model 374 can perform group-level targeting to determine whether at least one family or other group member would like a particular advertisement campaign 204a-204n or creative 206a-206m. To perform group-level targeting, the machine learning model 374 may obtain group personal device features 344, group personal device taste vector 366, shared device features 330b, group shared device taste vector 360b, taste match score 372, and advertisement knowledge graph 328. Using this information, the machine learning model 374 can estimate whether at least one member of a group would probably like an advertisement campaign 204a-204n or creative 206a-206m.

Although FIGS. 3A through 3D illustrate one example of a process 300 for segment generation, various changes may be made to FIGS. 3A through 3D. For example, various components shown in FIGS. 3A through 3D can be added, omitted, combined, further subdivided, replicated, or placed in any other suitable configuration according to particular needs. Also, depending on the implementation, the process 300 may use any suitable machine learning model(s) to perform one or more functions of the process 300.

FIG. 4 illustrates example personal and shared device data that may be used in the process 300 of FIGS. 3A through 3D in accordance with this disclosure. In particular, FIG. 4 illustrates example sources of information for use with the personal device data 304 and the shared device data 306. As shown in FIG. 4, the personal device data 304 may include personal data related to specific individuals, such as demographic data 402, game usage data 404, mobile app usage data 406, and cross-device advertising viewership data 408. In some cases, the demographic data 402 may include geographic data 402a related to the user or the user's device, a gender 402b of the user, and other information (such as the age of the user). As particular examples, the geographic data 402a of the user or device can include a country, state/province, county, city, postal code, mailing address, location provided by a global positioning system (GPS) or other navigation system, or any combination thereof.

In some cases, the game usage data 404 may include data associated with one or more games played by the user on one or more personal electronic devices. For example, the game usage data 404 may include an app identifier (app_id) 404a identifying each game, a game genre 404b corresponding to each game, and a game usage weight 404c corresponding to each game. Each app identifier 404a may represent a unique identification of a particular game, and different games can be associated with different app identifiers 404a. Each game genre 404b may represent a genre or category/type of the corresponding game. Each game usage weight 404c can represent a numerical value based on the usage count of the corresponding game (as determined by how many times the game was accessed over a given time period) or the duration of the corresponding game (as determined by the length of time that the game was played over a given time period). In some cases, each game usage weight 404c can represent a value between zero and one (inclusive). Each game usage weight 404c can be proportional to the usage count or duration of the corresponding game, such as when a game with a high usage has a high weight while a game with a low usage has a low weight.

In some cases, the mobile app usage data 406 may include data associated with one or more applications on a personal electronic device. For example, the mobile app usage data 406 may include an app identifier (app_id) 406a identifying each mobile app, an app genre 406b corresponding to each app, and a mobile app usage weight 406c corresponding to each app. Each app identifier 406a may represent a unique identification of a particular mobile app, and different mobile apps can be associated with different app identifiers 406a. Each app genre 406b may represent a genre or category/type of the corresponding mobile app. Each mobile app usage weight 406c can represent a numerical value based on the usage count of the corresponding mobile app (as determined by how many times the mobile app was accessed over a given time period) or the duration of the corresponding mobile app (as determined by the length of time that the mobile app was used over a given time period). In some cases, each mobile app usage weight 406c can represent a value between zero and one (inclusive). Each mobile app usage weight 406c can be proportional to the usage count or duration of the corresponding mobile app, such as when a mobile app with a high usage has a high weight while a mobile app with a low usage has a low weight.

In some cases, the cross-device advertising viewership data 408 may include data associated with advertisements on one or more personal electronic devices. For example, the cross-device advertising viewership data 408 may include ads genres 408a, impression weights 408b, click weights 408c, and CTR weights 408d. Each ads genre 408a may represent the genre or category/type of an advertisement received or viewed on a personal electronic device. Each impression weight 408b can represent a numerical value based on the number of times a user views one or more advertisements. In some cases, each impression weight 408b can represent a value between zero and one (inclusive). Each click weight 408c can represent a numerical value based on the number of times a user clicks on or otherwise selects advertisements. In some cases, each click weight 408c can represent a value between zero and one (inclusive). In addition, each CTR weight 408d can represent a numerical value based on the number of times a user clicks on or otherwise selects advertisements relative to the number of times the user is presented advertisements. In some cases, each CTR weight 408d can represent a value between zero and one (inclusive).

As shown in FIG. 4, the shared device data 306 may include data related to one or more shared devices, such as TV viewership data 412, TV app viewership data 414, linear ads viewership data 416, and TV connected game usage data 418. In some cases, the TV viewership data 412 may include data describing media content (referred to as "shows") viewed on one or more particular shared electronic devices. For example, the TV viewership data 412 may include a content identifier (content_id) 412a corresponding to each show, a content genre 412b corresponding to each show, and a TV usage weight 412c corresponding to how much the shared device is used to watch shows. Each content identifier 412a may represent a unique identification of a particular show, and different shows can be associated with different content identifiers 412a. Each content genre 412b may represent a genre or category/type of the corresponding show. The TV usage weight 412c can represent a numerical value based on the usage count or duration of the shared device being used to watch shows. In some cases, the TV usage weight 412c can represent a value between zero and one (inclusive).

In some cases, the TV app viewership data 414 may include data associated with one or more TV or other media content apps on at least one shared electronic device. For example, the TV app viewership data 414 may include a content identifier (content_id) 414a corresponding to each show viewed on the at least one media content app, a content genre 414b corresponding to each show viewed on the at least one media content app, and a TV app usage weight 414c corresponding to how much the at least one media content app is used to watch shows. Each content identifier 414a may represent a unique identification of a particular show, and different shows can be associated with different content identifiers 414a. Each content genre 414b may represent a genre or category/type of the corresponding show. The TV app usage weight 414c can represent a numerical value based on the usage count or duration of the at least one media content app being used to watch shows. In some cases, the TV app usage weight 414c can represent a value between zero and one (inclusive).

In some cases, the linear ads viewership data 416 may include data associated with advertisements presented or viewed on at least one shared electronic device. For example, the linear ads viewership data 416 may include ads genres 416a, impression weights 416b, click weights 416c, and CTR weights 416d. These fields may be the same as or similar to the corresponding fields of the cross-device advertising viewership data 408. In addition, the TV connected game usage data 418 may include data associated with one or more games played by the users on one or more shared devices. For instance, the TV connected game usage data 418 may include an app identifier (app_id) 418a identifying each game, a game genre 418b corresponding to each game, and a game usage weight 418c corresponding to each game. These fields may be the same as or similar to the corresponding fields of the game usage data 404.

Features may be generated using the personal device data 304 and the shared device data 306 in any suitable manner, such as via encoding (like with word2vec or OneHot encoding). As particular examples, content identifier (content_id) features can be generated using word2vec encoding, and content genre features can be generated using OneHot encoding. As described below, when a user has multiple associated features (such as TV viewership data from multiple devices), techniques can be used to aggregate the features in order to represent the overall features of the user. As a particular example, a user may have three viewership logs with content genre features as follows: [0, 1, 1, 1, 0], [1, 1, 1, 1, 0], and [0, 1, 1, 0, 1]. Averaging may be used to produce content genre features of [0.33, 1, 1, 0.67, 0.33] for the user across all three devices, or maximum values may be selected to produce content genre features of [1, 1, 1, 1, 1] for the user across all three devices.

Although FIG. 4 illustrates one example of personal and shared device data that may be used in the process 300 of FIGS. 3A through 3D, various changes may be made to FIG. 4. For example, any other or additional data may be used in or as a part of the personal device data 304. Similarly, any other or additional data may be used in or as a part of the shared device data 306.

Figure 5A:
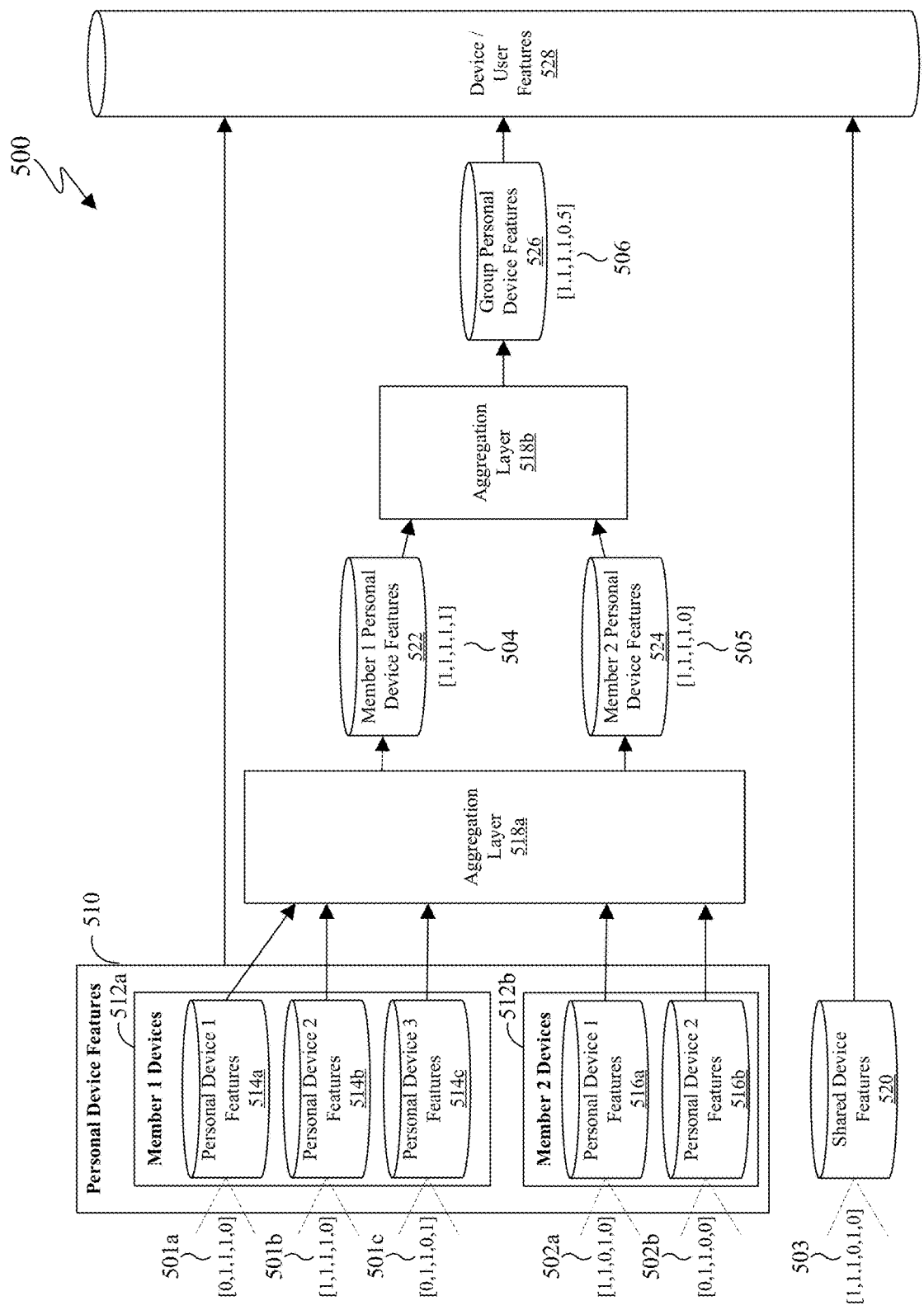
FIGS. 5A and 5B illustrate an example process for generating and aggregating features corresponding to multiple devices in accordance with this disclosure.
Figure 5B:
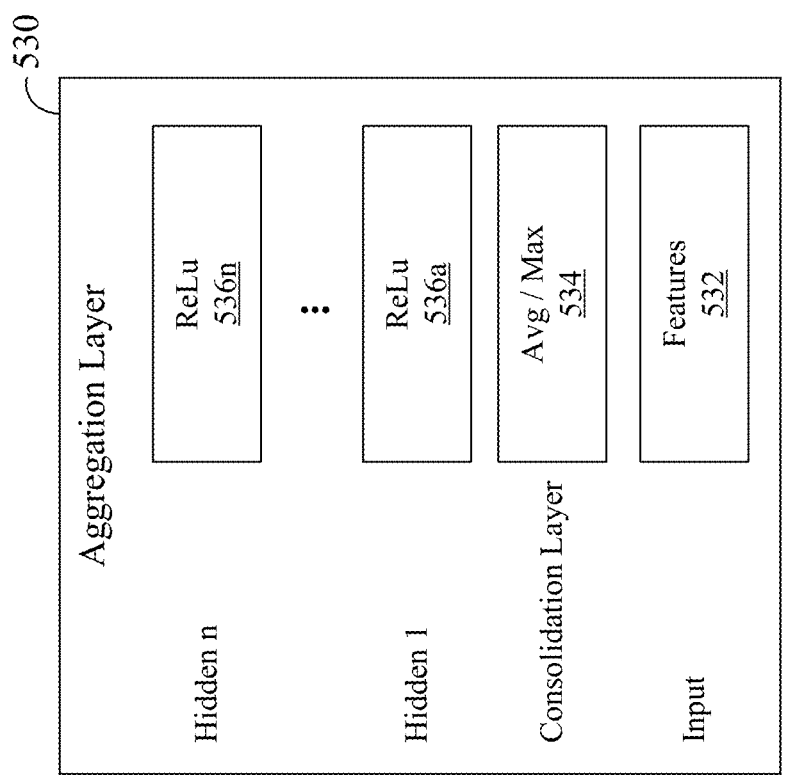

FIGS. 5A and 5B illustrate an example process 500 for generating and aggregating features corresponding to multiple devices in accordance with this disclosure. For example, the process 500 here may be used as part of the process 300 to generate the group personal device features 344. For ease of explanation, the process 500 of FIGS. 5A and 5B may be described as being performed by the server 106 in the network configuration 100 of FIG. 1. However, the process 500 of FIGS. 5A and 5B may be performed by any other suitable device(s) and in any other suitable system (s), such as when performed by the electronic device 101.

Figure 3B:
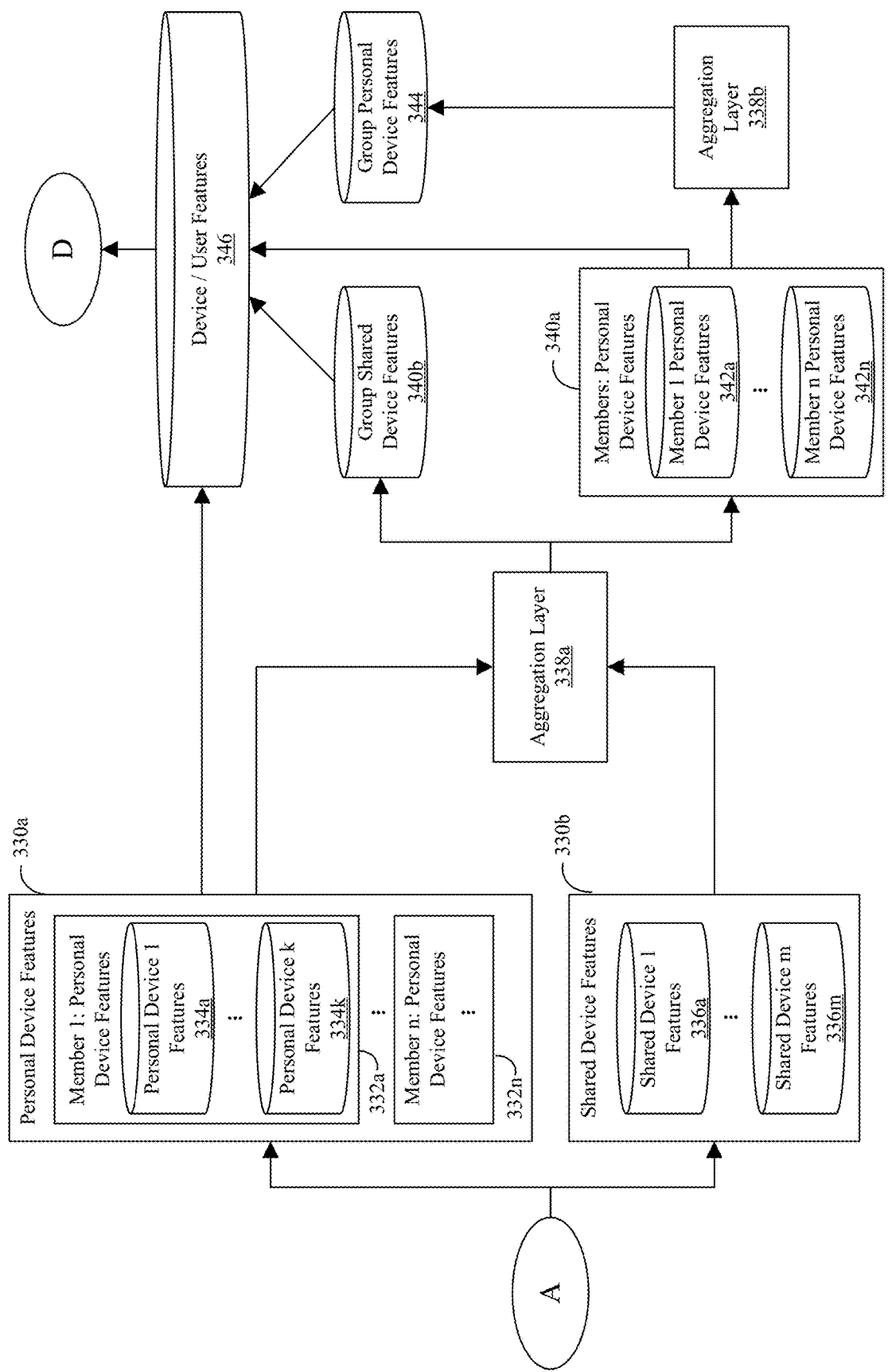
Figure 3C:
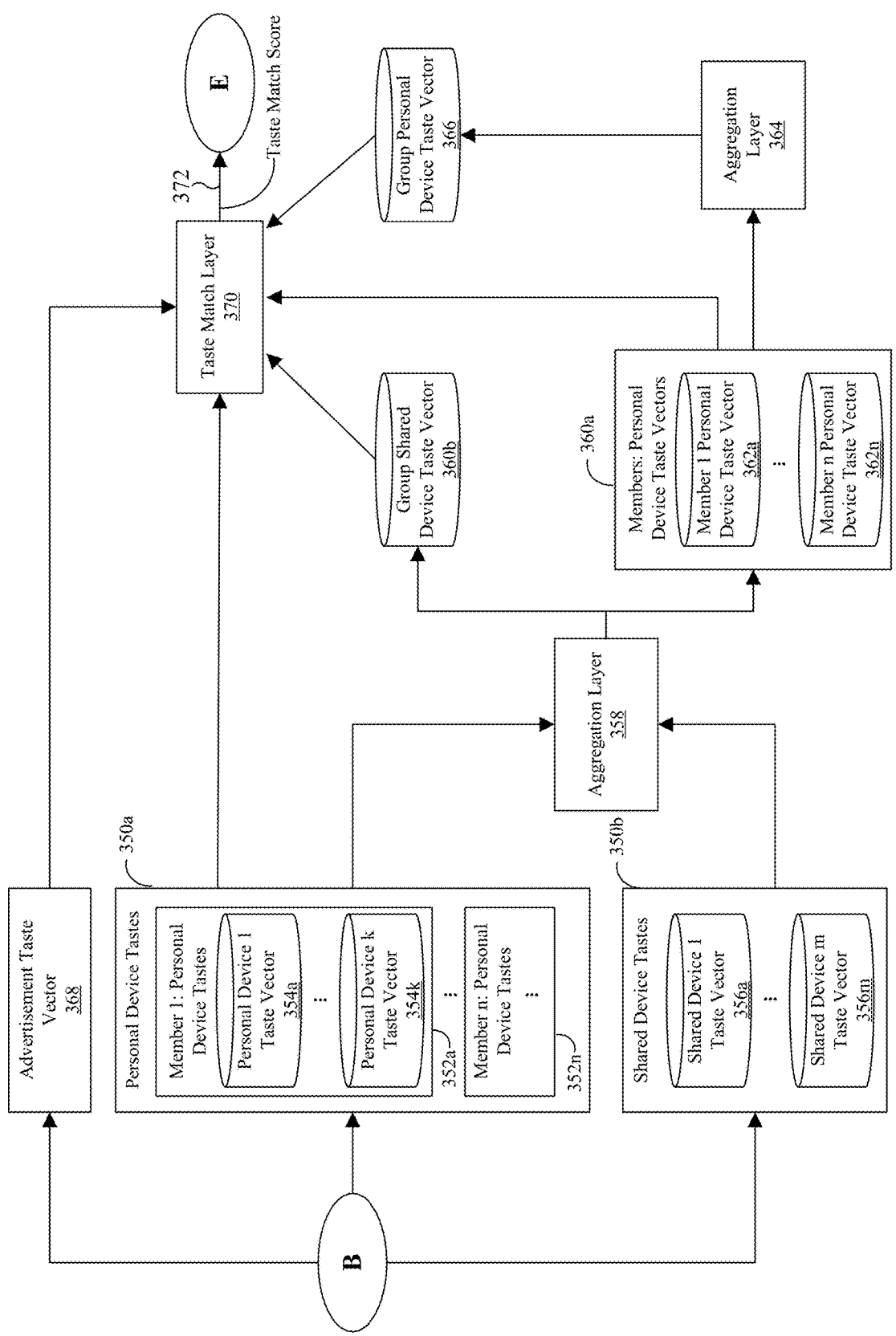

As shown in FIG. 5A, the process 500 is similar to the portion of the process 300 shown in FIG. 3B. Here, personal device features 510 include features of personal electronic devices associated with two different members of a household. The personal device features 510 include personal device features 512a for a first household member and personal device features 512b for a second household member. The personal device features 512a include device features 514a-514c for three personal devices of the first household member, and the personal device features 512b include device features 516a-516c for two personal devices of the second household member. Also, shared device features 520 include features from one or more shared devices within the household. An aggregation layer 518a (which may represent the aggregation layer 338a of FIG. 3B) combines the personal device features 514a-514c into personal device features 522 and combines the personal device features 516a-516b into personal device features 524. An aggregation layer 518b (which may represent the aggregation layer 338b of FIG. 3B) combines the personal device features 522 and 524 into group personal device features 526 (which may represent the group personal device features 334 of FIG. 3B). The personal device features 510, the group personal device features 526, and the shared device features 520 can be used to form device/user features 528 (which may represent the device/user features 346 of FIG. 3B).

As shown in FIG. 5A, features 501a-501c represent sets of features in the personal device features 514a-514c, which can be identified by a feature generator (such as the device feature generator 316 of FIG. 3A). Similarly, features 502a-502b represent sets of features in the personal device features 516a-516b, which can be identified by the feature generator. In addition, features 503 represent a set of features in the shared device features 520, which can be identified by the feature generator. The various features 501a-501c can be combined using the aggregation layer 518a to produce the personal device features 522, and the various features 502a-502b can be combined using the aggregation layer 518a to produce the personal device features 524. The personal device features 522 and 524 can be combined using the aggregation layer 518b to produce the group personal device feature 526.

For individual-level targeting, the features of a particular user can be concatenated or otherwise combined with shared device features. For example, features 504 or 505 associated with a specific user's personal device features 522 or 524 can be concatenated or otherwise combined with the features 503. In this example, the resulting features for the first user may be expressed as [1, 1, 1, 1, 1, 1, 1, 1, 0, 1, 0]. For group-level targeting, the features of a group of personal devices can be concatenated or otherwise combined with shared device features. For instance, features 506 associated with a group of personal devices can be concatenated or otherwise combined with the features 503. In this example, the resulting features may be expressed as [1, 1, 1, 1, 0.5, 1, 1, 1, 0, 1, 0]. For device-level targeting, the features of a particular personal device can be concatenate or otherwise combined with shared device features. For example, the features 501a, 501b, or 501c associated with one device can be concatenated or otherwise combined with the features 503 of at least one shared device. In this example, the resulting features for the first user's first device may be expressed as [0, 1, 1, 1, 0, 1, 1, 1, 0, 1, 0].

An aggregation layer 530 shown in FIG. 5B may be used to generate individual and group features (as well as advertiser and campaign tastes). For example, the aggregation layer 530 may be used to implement the aggregation layer 326 of FIG. 3A, the aggregation layers 338a and 338b of FIG. 3B, the aggregation layers 358 and 364 of FIG. 3C, or the aggregation layers 518a and 518b of FIG. 5A. As shown in FIG. 5B, the aggregation layer 530 includes an input layer 532, a consolidation layer 534, and multiple hidden layers 536a-536n. The input layer 532 can be used to receive one or more sets of features to be aggregated. The consolidation layer 534 can be used to consolidate the input features, such as by averaging the input features or identifying maximum values of the input features. Each of the hidden layers 536a-536n can process the outputs of a previous layer, and the final hidden layer 536n can produce aggregated features. In some cases, each of the hidden layers 536a-536n includes a rectified linear unit (ReLu).

In some embodiments, the aggregation layer 518a of FIG. 5A combines the features 514a-514c to generate the personal device features 522, and the aggregation layer 518a combines the features 516a-516b to generate the personal device features 524. For example, the aggregation layer 518a may combine the features 501a-501c or 502a-502b using its consolidation layer 534. As a particular example, to combine the features 501a-501c, the consolidation layer 534 may average the feature values in order to generate a vector, such as a vector of [0.33, 1, 1, 0.67, 0.33]. That vector is embedded, such as by using the hidden layers 536a-536n. In some cases, the embedding by the hidden layers 536a-536n can be performed based on the following operation.

$$F(X)=(WX+b)*\text{activation} \tag{10}$$

Here, X is an output of the consolidation, such as [0.33, 1, 1, 0.67, 0.33]. Also, W is a weight, b is a bias, and activation represents the operation of the hidden layers 536a-536n. In some embodiments, the values of W and b can be learned by a machine learning model during training of the machine learning model. In this example, the output of the aggregation layer 518a is [1, 1, 1, 1, 1] for the features 501a-501c, which corresponds to the feature 504 and is produced by taking the maximum values of the features 501a-501c. The same operations may be performed to produce the feature 505. Similar operations may be performed to produce the feature 506, except here the aggregation layer 518*b* uses averaging to produce the feature 506.

Although FIGS. 5A and 5B illustrate one example of a process 500 for generating and aggregating features corresponding to multiple devices, various changes may be made to FIGS. 5A and 5B. For example, various components shown in FIGS. 5A and 5B can be added, omitted, combined, further subdivided, replicated, or placed in any other suitable configuration according to particular needs. Also, depending on the implementation, the process 500 may use any suitable machine learning model(s) to perform one or more functions of the process 500.

Figure 6:
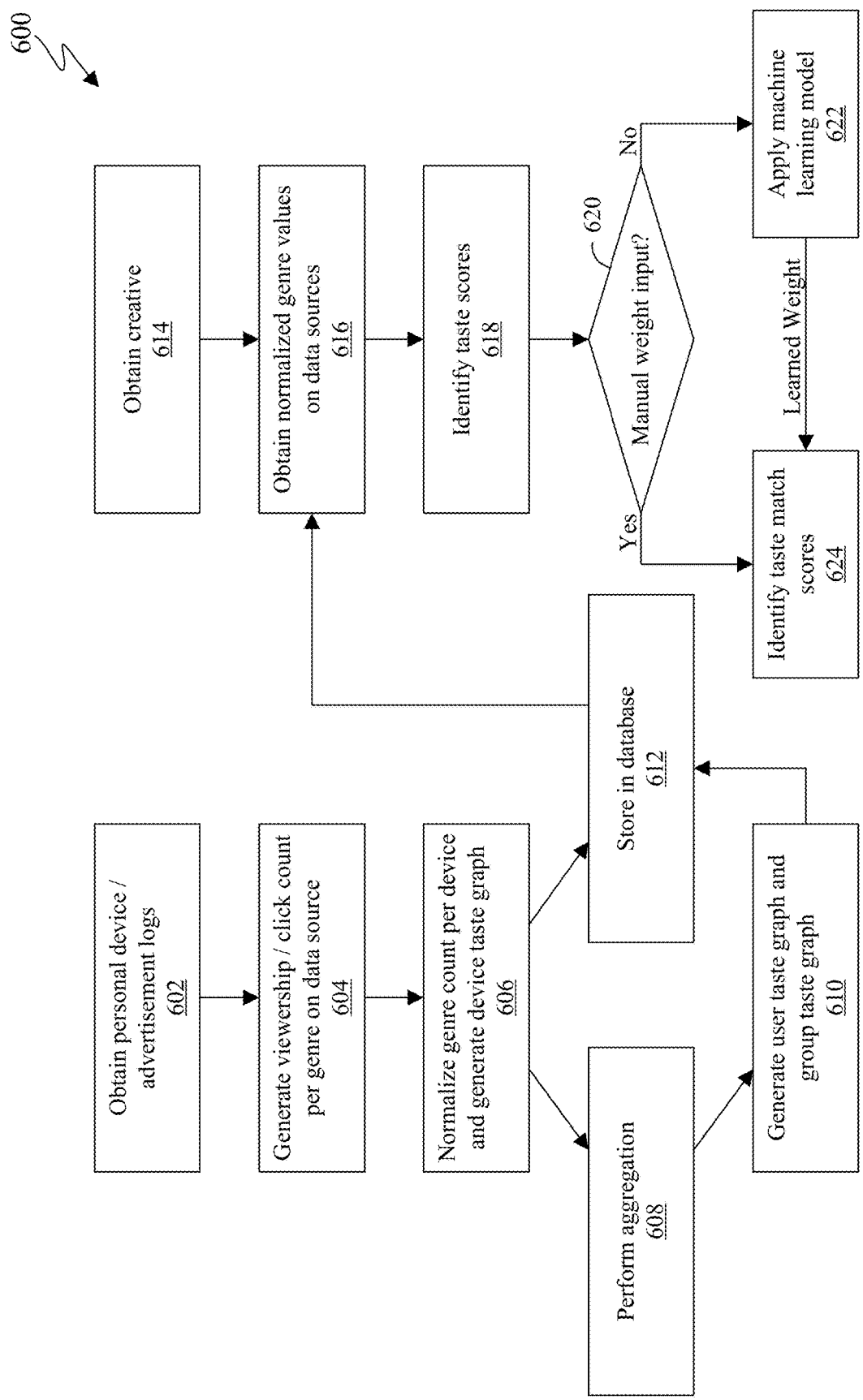
FIG. 6 illustrates an example process for generating a taste graph and a taste match score in accordance with this disclosure.
Figure 7:
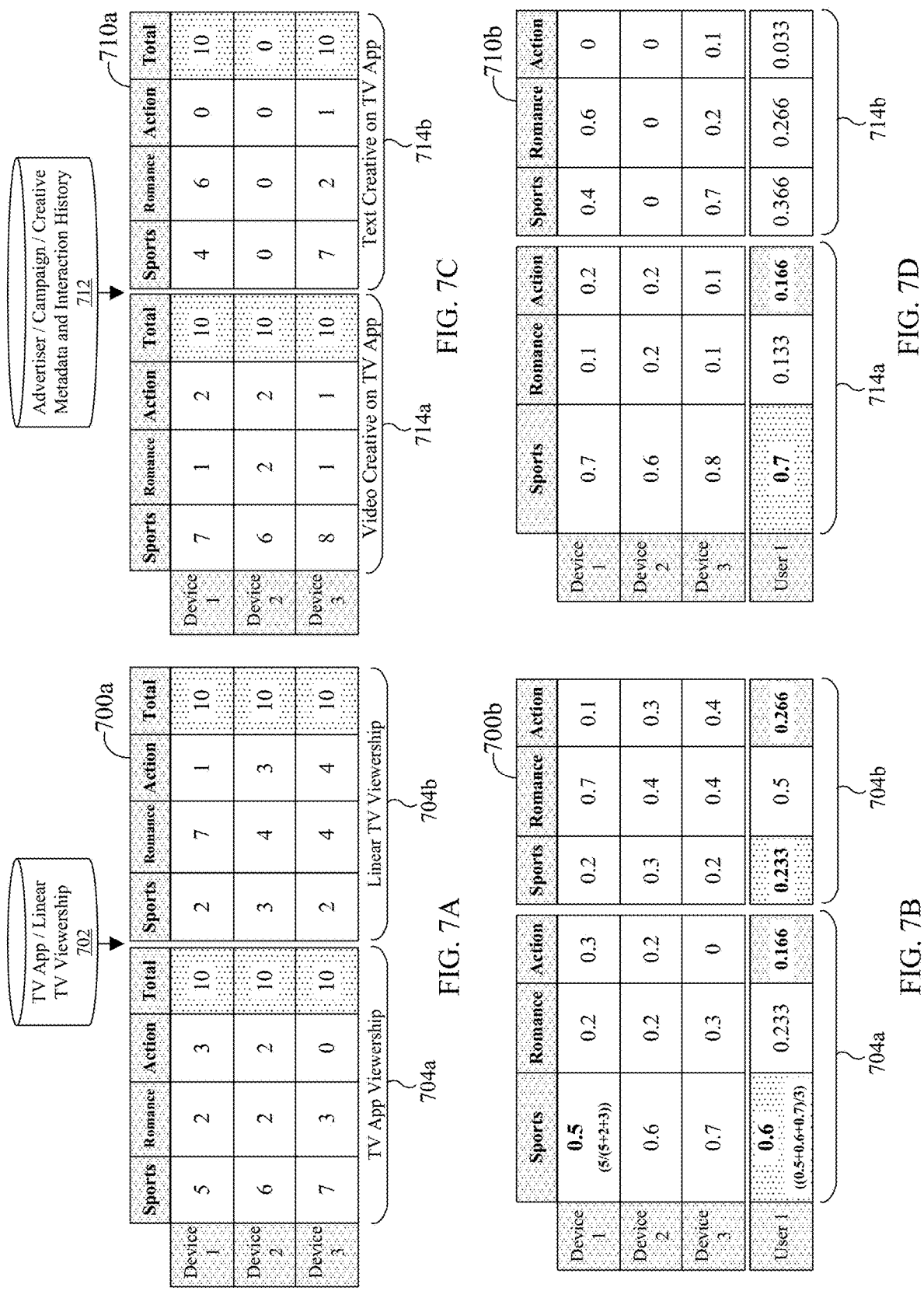
FIGS. 7A through 7D illustrate example results associated with the process of FIG. 6 in accordance with this disclosure.

FIG. 6 illustrates an example process 600 for generating a taste graph and a taste match score in accordance with this disclosure. For example, the process 600 here may be used as part of the process 300 to generate a taste graph (by the taste graph generator 318) and to generate a taste match score (by the taste match layer operation 370). For ease of explanation, the process 600 of FIG. 6 may be described as being performed by the server 106 in the network configuration 100 of FIG. 1. However, the process 600 of FIG. 6 may be performed by any other suitable device(s) and in any other suitable system(s), such as when performed by the electronic device 101.

In this example, a taste graph represents a log of a user's genre favorite score and is generated by the taste graph generator 318 of FIG. 3A. Also, the taste match score is the taste match score 372 and represents a genre consume relationship between device usage and advertisements using a taste graph. In some cases, the taste match score 372 of a user can be expressed as follows.

$$\text{Taste Match Score} = \sum_{j=1}^{M}\sum_{i=1}^{N} w_{ij} * (\text{Taste score on user data source } i \text{ and } ads \text{ data source } j) \quad (11)$$

Here, N is the number of user data sources, M is the number of advertisement data sources, $w_{ij}$ is a weight of a taste score for data sources i and j, and $\Sigma_j^M \Sigma_i^N = 1$. As a particular example, using two data sources (denoted as X and Y) for the user and one data source (denoted as Z) for the advertisements, the taste match score 372 can be represented as follows.

Taste Match Score=$w_1$(Taste score on user data source X and ads data source Z)+$w_2$(Taste score on user data source Y and ads data source Z) (12)

Here, $w_1$ and $w_2$ can be learned by a machine learning model during training or can be input manually. The expression "Taste score on user data source X and ads data source Z" may be defined as follows.

Taste score on user data source X and ads data source Z=(Device/user/group's genre G score on data source X)* (Genre G score on video/ text creative on data source Z) (13)

Also, the expression "Taste score on user data source Y and ads data source Z" from Equation (12) may be defined as follows.

Taste score on user data source Y and ads data source Z=(Device/user/family's genre G score on data source Y)* (Genre G score on video/ text creativeondata source Z) (14)

The data sources X, Y, and Z can be from or represent any suitable data sources, such as a TV app, linear TV, game app, mobile app, and the like.

As shown in FIG. 6, at step 602, a taste graph generator (such as the taste graph generator 318 implemented by the server 106 or other device) obtains personal device data and advertisement data. The personal device data can be the same as or similar to the personal device data 304 of FIG. 3A and may include, for example, information indicating that a user watched a particular show at a certain time. The advertisement data may include, for example, information indicating that the user clicked on a particular advertisement a certain number of times.

At step 604, the taste graph generator generates viewership and click counts per genre on data sources. For example, the taste graph generator 318 can determine that a particular device has had a certain number of clicks on advertisements in each specific genre. As a particular example, the taste graph generator 318 can determine that a particular device of the particular user had ten clicks for a sports genre. In some embodiments, the viewership and click counts per genre on data sources can be saved in a database or other location(s) for future reference. At step 606, the taste graph generator normalizes the genre count per each device and generates a device taste graph. The normalization here may include, for example, dividing the number of clicks per genre by the total number of clicks. At step 608, the device taste graph is aggregated, and user and group taste graphs are generated at step 610. For example, the taste graph generator 318 may generate a user taste graph based on the normalized data for that particular user, and this can be repeated for each user. Also, the taste graph generator 318 may generate a group taste graph based on the normalized data for a collection of multiple users. At step 612, the device taste graph, the user taste graph, and the group taste graph are stored in a database or other location(s).

At step 614, a taste match layer operation (such as the taste match layer operation 370 implemented by the server 106 or other device) obtains information about a creative. In some cases, the information can include a creatives genre, a creatives type (text, video, or both), and data source information associated with the creative. For example, the genre could be "stores," the type could be "video," and the data source could indicate that the creative is from a TV application. At step 616, the taste match layer operation obtains normalized genre values on data sources. For example, the normalized genre values can be obtained from the database that stores the taste graphs generated earlier in FIG. 6. At step 618, the taste match layer operation generates taste scores based on information related to the user data sources and advertisements. For example, the taste match layer operation may use Equations (13) and (14) to identify the taste scores.

At step 620, the taste match layer operation determines whether weights (such as $w_{ij}$ of Equation (11) and $w_1$ and $w_2$ of Equation (12)) are to be manually inputted. In response to a determination that the weights are not to be manually input, a machine learning model is used to identify the weights at step 622. Here, a trained machine learning model may be trained to identify which weights should be used when generating a taste match score 372. Otherwise, the weights are received via manual input. In either case, the taste match layer operation identifies a taste match score at step 624. In some cases, the taste match score 372 can be identified using Equations (11) and (12).

Although FIG. 6 illustrates one example of a process 600 for generating a taste graph and a taste match score, various changes may be made to FIG. 6. For example, while shown as a specific collection of steps, various steps in FIG. 6 may overlap, occur in series or in parallel, occur in a different order, or occur any number of times.

FIGS. 7A through 7D illustrate example results associated with the process 600 of FIG. 6 in accordance with this disclosure. For ease of explanation, the results of FIGS. 7A through 7D may be described as being generated using the process 600 described above, which may be performed using the server 106 or electronic device 101 in the network configuration 100 of FIG. 1. However, the results of FIGS. 7A through 7D may be generated using any other suitable device(s) and in any other suitable system(s).

As shown in FIGS. 7A through 7D, the process 600 may be used to generate a taste graph and a taste match score using various sources of data. In FIG. 7A, a table 700a represents a number of shows corresponding to different genres that are viewed by a user. In this example, the user has three electronic devices, and the viewership data corresponds to three different genres. However, any number of devices and any number of genres could be used. To generate the table 700a, the process 600 obtains data 702, such as TV app or linear TV viewership data. One part 704a of the table 700a corresponds to a portion of the data 702 associated with TV app viewership data, and another part 704b of the table 700a corresponds to a portion of the data 702 associated with linear TV viewership data. In this particular example, the TV app viewership data (part 704a) indicates that a device was used to watch a total of ten shows, of which five are related to sports, two are related to romance, and three are related to action.

In FIG. 7B, a table 700b represents the table 700a of FIG. 7A after a normalization operation is performed. This can occur, for instance, during step 606 of FIG. 6. For example, the normalization operation could normalize the genre count per device as part of the process of generating a device taste graph. To normalize the viewership count by genre count per device, the number of shows for each device per genre is divided by the total number of shows viewed. Thus, to normalize the TV app viewership data (corresponding to part 704a) here, the sports taste score for "Device 1" equals $$\frac{5}{5+2+3} = 0.5.$$

A similar normalization operation can be performed to normalize the viewership data by genre for all of the devices. In addition, a final row of the table 700b can be produced by averaging or otherwise using the normalization data in the other rows. For example, a user labeled "User 1" (who uses "Device 1," "Device 2," and "Device 3") has a sports taste score for the TV app viewership equal to $$\frac{0.5 + 0.6 + 0.7}{3}$$

In FIG. 7C, a table 710a represents a number of advertisements in different genres that were clicked on or otherwise selected and viewed by the user. In this example, the user has three electronic devices, and the advertisement data corresponds to three different genres. However, any number of devices and any number of genres could be used. To generate the table 710a, the process 600 obtains data 712, which may include metadata and one or more interactive histories associated with at least one advertiser 202, at least one campaign 204a-204n, or at least one creative 206a-206m. One part 714a of the table 710a corresponds to at least one video creative presented via a TV app, and another part 714b of the table 710a corresponds to at least one text creative presented via the TV app. For example, the part 714a indicates that the user (while watching a show) clicked on ten advertisements, of which seven are related to sports, one is related to romance, and two are related to action. In FIG. 7D, a table 710b represents the table 710a of FIG. 7C after a normalization operation is performed. This can occur, for instance, during step 606 of FIG. 6. Here, the table 710a may be normalized to produce the table 710b in the same or similar manner in which the table 700a is normalized to produce the table 700b.

The taste match score 372 relates the table 700b of FIG. 7B and the table 710b of FIG. 7D with respect to a particular genre. Using Equations (12)-(14), the taste match score 372 can be identified for a particular genre, such as sports or action. For example, assume X is TV app viewership (corresponding to part 704a), Y is linear TV viewership (corresponding to part 704b), and Z is a video creative (corresponding to part 714a) on the TV app. Also, assume that the genre G is sports, and the weights are manually provided or determined via machine learning to be $w_1=0.8$ and $w_2=0.2$. Based on these assumptions, Equations (12)-(14) can be respectively rewritten as Equations (12a)-(14a) in the following manner.

$$\text{Taste Match Score} = 0.8*(\text{Taste score on TV app viewship and Video Creative ads on TV app}) + 0.2*(\text{Taste score on Linear TV viewship data and Video Creative ads on TV app}) \quad (12a)$$

$$\text{Taste Score on TV app viewship and Video Creative ads on TV app} = (\text{User1's Sports genre score on TV app viewship})*(\text{Sports genre score on Video Creative on TV App}) \quad (13a)$$

$$\text{Taste Score on Linear TV viewship data and Video Creative ads on TV app} = (\text{User1's Sports genre score on Linear TV viewship})* (\text{Sports genre score on Video Creative on TV app}) \quad (14a)$$

In FIG. 7B, for "User 1", the sports genre score corresponding to the TV app viewership (part 704a) is 0.6, and the sports genre score corresponding to the linear TV viewership (part 704b) is 0.233. In FIG. 7D, the sports genre score on video creatives (part 714a) on the TV app is 0.7. As such, Equations (13a)-(14a) can be respectively rewritten as Equations (13b)-(14b) in the following manner.

$$\text{Taste score on TV app viewership and Video Creative ads on TV app} = 0.6*0.7 = 0.42 \quad (13b)$$

$$\text{Taste score on Linear TV viewership and Video Creative ads on TV app} = 0.233*0.7 = 0.1631 \quad (14b)$$

The taste match score as defined in Equation (12a) may be calculated as follows.

$$\text{Taste Match Score} = (0.8*0.42) + (0.2*0.1631) = 0.36862 \quad (12b)$$

As another example, assume X is the TV app viewership (corresponding to part 704a), Y is the linear TV viewership (corresponding to part 704b), and Z is a TV app video creative (corresponding to part 714a). Also, assume the genre G is action, and the weights are manually provided or determined via machine learning to be $w_1=0.8$ and $w_2=0.2$. Here, Equations (12)-(14) can be respectively rewritten as Equations (12c)-(14c) in the following manner.

$$\begin{aligned}\text{Taste Match Score}=&0.8*(\text{Taste score on TV app}\\&\text{viewship and Video Creative ads on TV app})+\\&0.2*(\text{Taste score on Linear TV viewship data}\\&\text{and Video Creative ads on TV app})\end{aligned} \quad (12c)$$

$$\begin{aligned}\text{Taste score on TV app viewship and Video Creative}\\\text{ads on TV app}=&(\text{User1's Action genre score on}\\&\text{TV app viewship})*(\text{Action genre score on}\\&\text{Video Creative on TV App})\end{aligned} \quad (13c)$$

$$\begin{aligned}\text{Taste score on Linear TV viewship data and Video}\\\text{Creative ads on TV app}=&(\text{User1's Action genre}\\&\text{score on Linear TV viewship})*(\text{Action genre}\\&\text{score on Video Creative on TV app})\end{aligned} \quad (14c)$$

In FIG. 7B, for "User 1", the action genre score corresponding to the TV app viewership (part 704a) is 0.2, and the action genre score corresponding to the linear TV viewership (part 704b) is 0.266. In FIG. 7D, the action genre score on video creatives (part 714a) on the TV app is 0.166. As such, Equations (13c)-(14c) can be respectively rewritten as Equations (13d)-(14d) in the following manner.

$$\text{Taste score on TV app viewership and Video Creative ads on TV app}=0.166*0.166=0.028 \quad (13d)$$

$$\text{Taste Score on Linear TV viewership and Video Creative ads on TV app}=0.266*0.166=0.044 \quad (14d)$$

The taste match score as defined in Equation (12c) may be calculated as follows.

$$\text{Taste Match Score}=(0.8*0.028)+(0.2*0.044)=0.0312 \quad (12d)$$

Comparing the taste match score of "User 1" for a sports video creative (0.36862) to the taste match score of "User 1" for an action video creative (0.0312) indicates that the user will have a higher interest in a sports-based creative than an action-based creative. This result can be used to provide more sports-related creatives to the user and fewer or no action-based creatives.

Although FIGS. 7A through 7D illustrate one example of results associated with the process 600 of FIG. 6, various changes may be made to FIGS. 7A through 7D. For example, the specific results shown in FIGS. 7A through 7D are examples only and are merely meant to illustrate how certain results can be used to generate taste match scores 372.

Figure 8:
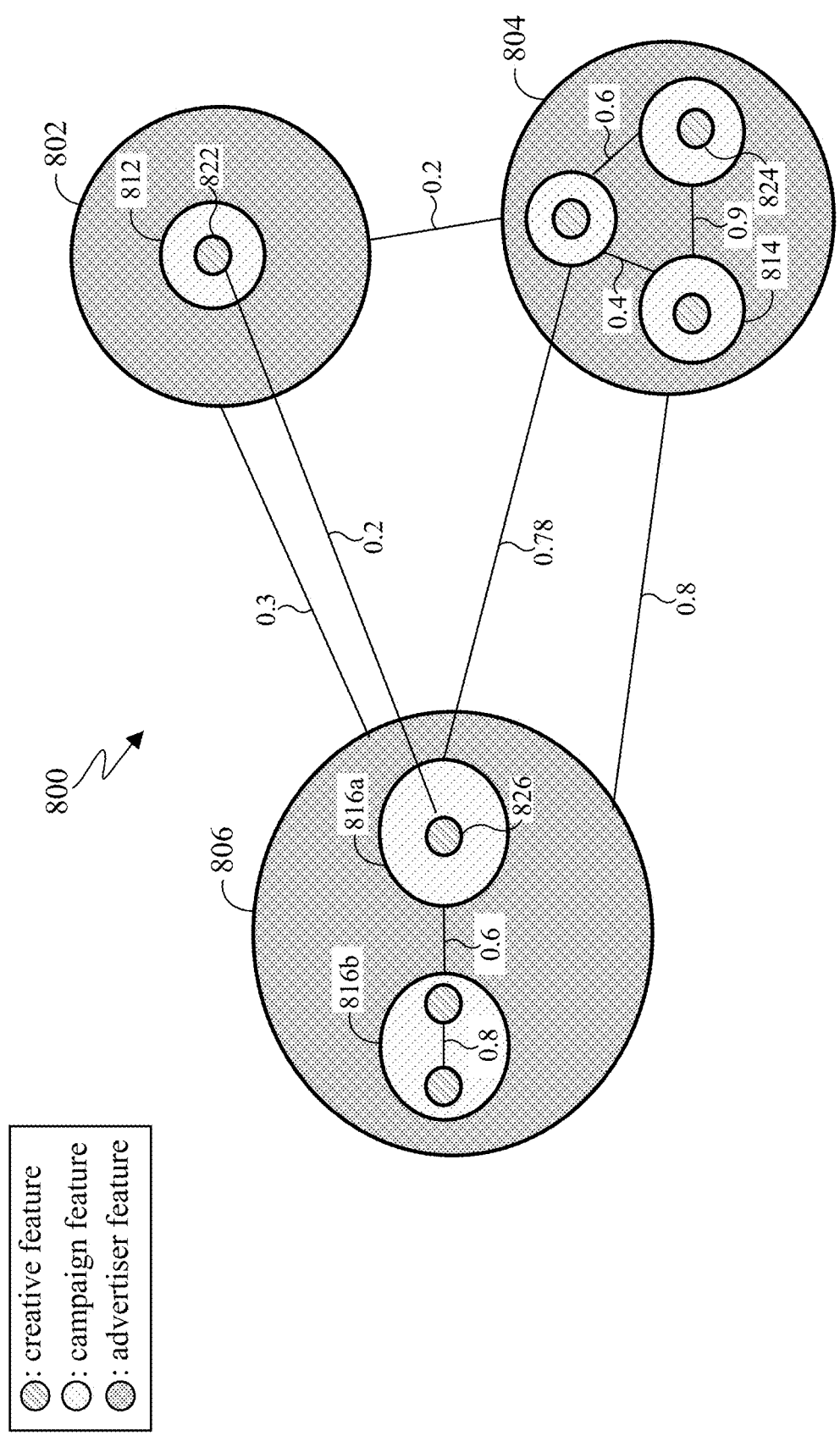
FIG. 8 illustrates an example knowledge graph used to generate advertiser, campaign, and creative features in accordance with this disclosure.

FIG. 8 illustrates an example knowledge graph 800 used to generate advertiser, campaign, and creative features in accordance with this disclosure. The knowledge graph 800 may, for example, represent an example implementation of the advertisement knowledge graph 328. In general, a knowledge graph indicates a level of similarity between a set of features. For example, a knowledge graph can be expressed as follows.

$$\text{Knowledge graph}=\text{set of}(V,E) \quad (15)$$

Here, V is an advertisement feature, a campaign feature, or a creative feature (which are illustrated as vertices in FIG. 8). Also, E represents a similarity between features. In some cases, a campaign feature can include at least one set of creative features, and an advertiser feature can include at least one set of campaign features.

As shown in FIG. 8, three advertisers are associated with campaigns and creatives. More specifically, an advertiser 802 is associated with a single campaign 812 having a single creative 822. An advertiser 804 is associated with three campaigns 814 each having a single creative 824. An advertiser 806 is associated with two campaigns, where one campaign 816a has a single creative 826 and another campaign 816b has two creatives 826. The vertices in the knowledge graph 800 here can be used to relate the level of similarity between different advertiser, campaign, and creative features. Specific edge values shown in FIG. 8 indicate how closely two set of features are related. For example, the advertisers 804 and 806 are closely related (with an edge value of 0.8). In contrast, the advertisers 802 and 806 are not closely related (with an edge value of 0.3), and the advertisers 802 and 804 are not closely related (with an edge value of 0.2).

Although FIG. 8 illustrates one example of a knowledge graph 800 used to generate advertiser, campaign, and creative features, various changes may be made to FIG. 8. For example, any number of advertiser features, campaign features, and creative features can be included in the knowledge graph 800. Also, the edge values representing the strengths of relationships in the knowledge graph 800 can vary depending on the specific circumstances.

FIGS. 9A through 9D illustrate example processes for generating advertiser, campaign, and creative features in accordance with this disclosure. For example, the processes here may be used as part of the process 300 (such as by the advertisement feature generator 324) to generate the advertisement knowledge graph 328. For ease of explanation, the processes of FIGS. 9A through 9D may be described as being performed by the server 106 in the network configuration 100 of FIG. 1. However, the processes of FIGS. 9A through 9D may be performed by any other suitable device(s) and in any other suitable system(s), such as when performed by the electronic device 101.

Figure 9A:
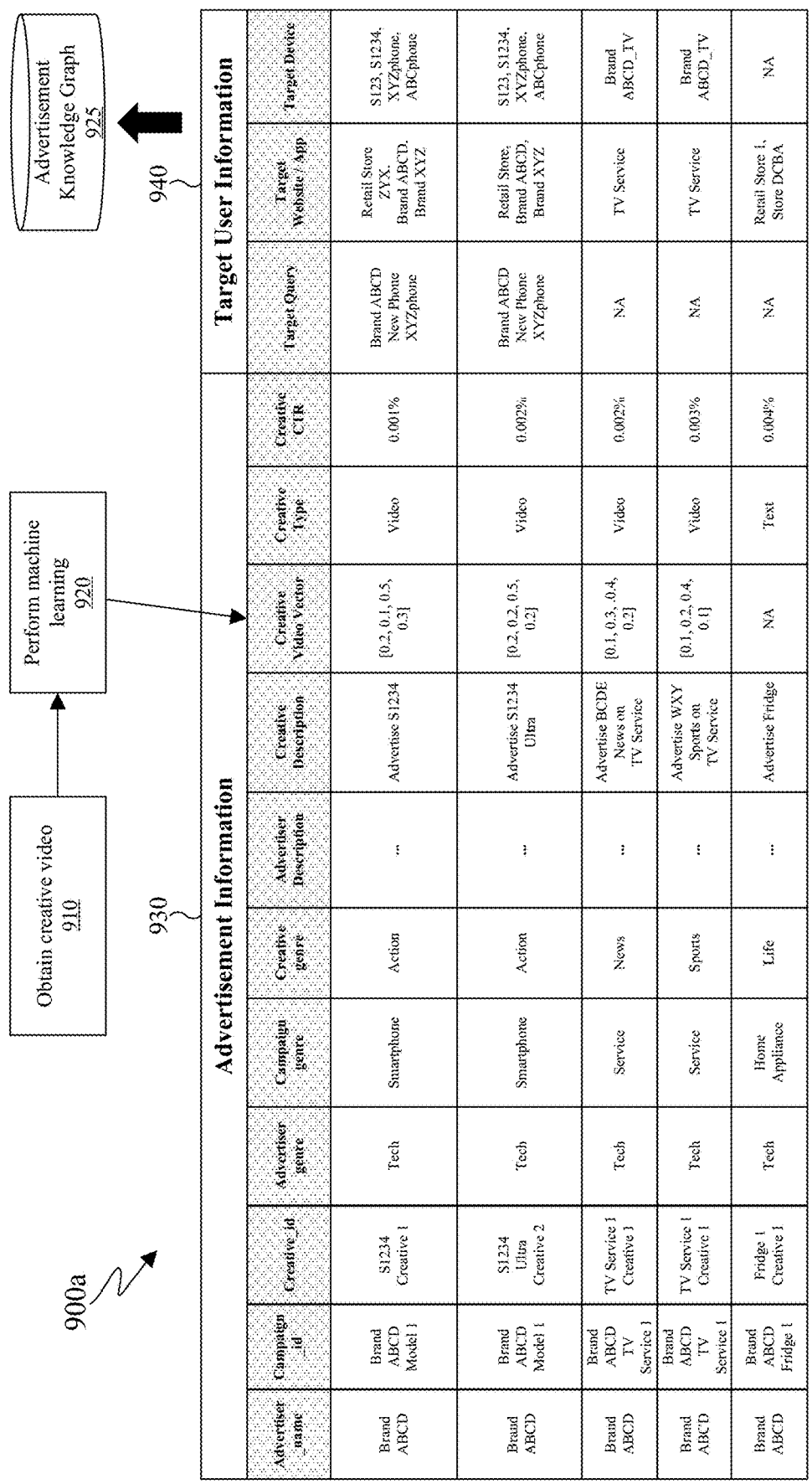
FIGS. 9A through 9D illustrate example processes for generating advertiser, campaign, and creative features in accordance with this disclosure.

In FIG. 9A, a process is used to organize advertiser information (such as the advertiser information 320) into a table 900a that includes advertisement information 930 and target user information 940. The advertisement information 930 includes advertisement metadata (such as genre), a description of advertisements, a description of the associated creative(s), the type(s) of the creative(s), and a desired creative CTR. The advertisement information 930 also includes creative video vectors, each of which may be obtained using a machine learning model. For example, at step 910, the advertisement feature generator 324 obtains a video creative. At step 920, the creative is provided to a trained machine learning model, such as a convolutional neural network (CNN), other deep neural network, or other machine learning model, which outputs the associated creative video vector. The information included in the table 900a is processed and aggregated to form an advertisement knowledge graph 925 (which may represent the advertisement knowledge graph 328 of FIG. 3A).

The target user information 940 describes which users an advertiser wants to target, and a target query can indicate which user(s) the advertiser will target. For example, if a user searches for "new phone," an advertisement related to product "S1234" can be provided. A target website/app is used to provide (impress) the advertisement when a user visits the website or uses the app. For instance, when the user visits a website of a particular retail store, the advertisement can be pushed to the user's device. A target device specifies which device or devices the advertiser wants to target. For example, an advertisement for the S1234 smartphone may be presented if the user device is an XYZphone.

As illustrated here, a company ("Brand ABCD") has three different advertisement campaigns, each corresponding to one or more creatives for a total of five creatives. For example, rows 1 and 2 describe an advertisement campaign denoted as "Brand ABCD Model 1," rows 3 and 4 describe an advertisement campaign denoted as "Brand ABCD TV Service 1," and row 5 describes an advertisement campaign denoted as "Brand ABCD Fridge 1."

Figure 9B:
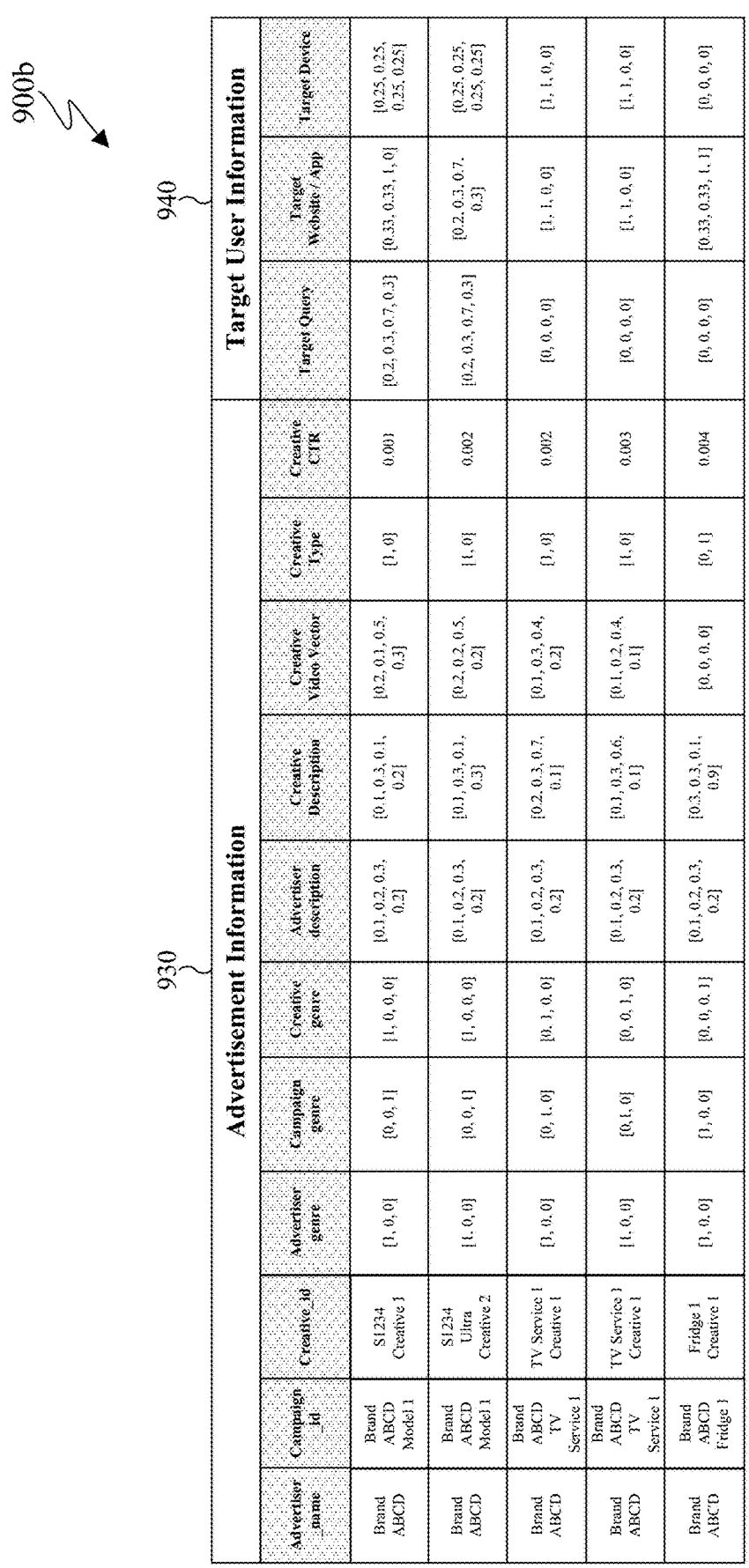

In FIG. 9B, a table 900b shows example results of feature generation using the data from the table 900a. In some embodiments, the features in the table 900b are generated using word2vec encoding and OneHot encoding. For instance, target device features can be generated using OneHot encoding, while creative features can be generated using word2vec encoding. When multiple values are in a cell of the table 900a, a feature can be generated for each term. For example, if multiple target devices are present, a feature encoding can be performed for each target device. In some cases, a feature for each term can be generated, and the features can be averaged or otherwise processed to generate the feature corresponding to that cell in the table 900b. When a cell in the table 900a is empty, it can be replaced with a vector containing zeros in the table 900b.

Figures 9C, 9D:

In FIG. 9C, a table 900c shows the results of aggregating the features from the table 900b. For example, the feature aggregation can be performed using the aggregation layer 326 of FIG. 3A. Here, multiple creatives that belong to the same campaign can be combined, so rows 1 and 2 of FIG. 9B are aggregated into row 1 of FIG. 9C and rows 3 and 4 of FIG. 9B are aggregated into row 2 of FIG. 9C. In FIG. 9D, a table 900d shows the results of aggregating the features from the table 900c. For instance, the feature aggregation can be performed using the aggregation layer 326 of FIG. 3A. Here, multiple campaigns that belong to the same advertiser are combined. Thus, rows 1-3 of FIG. 9C are aggregated into row 1 of FIG. 9D.

In some embodiments, when "Brand ABCD" has a new campaign but not enough information to generate features, the machine learning model of FIG. 9A can use the advertiser's features tofind similar campaign features or find similar creative features based on a knowledge graph 925. For example, the machine learning model of FIG. 9A may find similar information from the genres and descriptions of previous advertisements, campaigns, or creatives. In this example, the machine learning model can access information about previous campaigns and creatives from "Brand ABCD" and find similar genre and descriptions, such as by using a cosine similarity or term frequency-inverse document frequency (TF/IDF), and the machine learning model can use similar features for a newly-received creative. As another example, the machine learning model of FIG. 9A may be configured to generate new features using existing features. In this example, assume there is a new campaign or video creative for a specified product. The machine learning model can find similar campaigns and creatives and identify features of those similar campaigns and creatives (such as target websites/apps) for use with the new campaign or creative.

Although FIGS. 9A through 9D illustrate examples of processes for generating advertiser, campaign, and creative features, various changes may be made to FIGS. 9A through 9D. For example, the specific features, feature values, and aggregated feature values are examples only and are merely meant to illustrate how features may be generated and aggregated.

FIGS. 10A through 10G illustrate an example process 1000 for segment generation using machine learning models in accordance with this disclosure. For ease of explanation, the process 1000 of FIGS. 10A through 10G may be described as being performed by the server 106 in the network configuration 100 of FIG. 1. However, the process 1000 of FIGS. 10A through 10G may be performed by any other suitable device(s) and in any other suitable system(s), such as when performed by the electronic device 101.

At step 1010, personal device logs are obtained. In some cases, the personal device logs can be obtained using the data 302 and the personal device data 304 of FIG. 3A. As a particular example, the personal device logs can indicate that a user used a specific application at a specific time. The personal device logs can also indicate that a user used a specific application for a specific duration. A device mapping database is accessed at step 1011, and a determination is made whether a suitable mapping in the device mapping database is successfully found at step 1012. The device mapping database can associate one or more specific devices with one or more specific users. In response to a determination that a suitable mapping in the device mapping database was not successfully found, the process returns to step 1010. In this case, it cannot yet be determined which device(s) may be associated with which user(s).

In response to a determination that a suitable mapping in the device mapping database was successfully found, personal device features are generated at step 1013. For example, the device features can be generated by the device feature generator 316 of FIG. 3A. The generated features are saved in a personal device feature database or other location(s) at step 1014. In some cases, the personal device features can represent the personal device features 330a of FIG. 3B. At step 1015, a taste graph is generated. For instance, the taste graph can be generated by the taste graph generator 318 of FIG. 3A. A personal device taste vector generated for the device is saved in a database or other location(s) at step 1016. In some cases, the personal device taste vector can represent one of the personal device taste vectors 354a-354k.

At step 1017, a determination is made whether group-level segmentation is to be performed. If so, a mapping database is accessed at step 1018. The mapping database can be used to associate different individual members with a group and may include the personal device features of the group members (as determined previously). At step 1019, group members' personal device features are obtained from the mapping database. At step 1020, the personal device features are aggregated in order to generate group personal device features. In some cases, this can be performed using the aggregation layer 338a. The group personal device features are stored in a database or other location(s) at step 1021. At step 1022, personal device taste vectors for the group members are aggregated to generate a group personal device taste vector, and the generated group personal device taste vector is stored in a database or other location(s) at step 1023. In response to a determination not to use group-level segmentation, individual users' personal device features are obtained at step 1024, and individual users' personal taste vectors are obtained at step 1025.

Figure 10A:
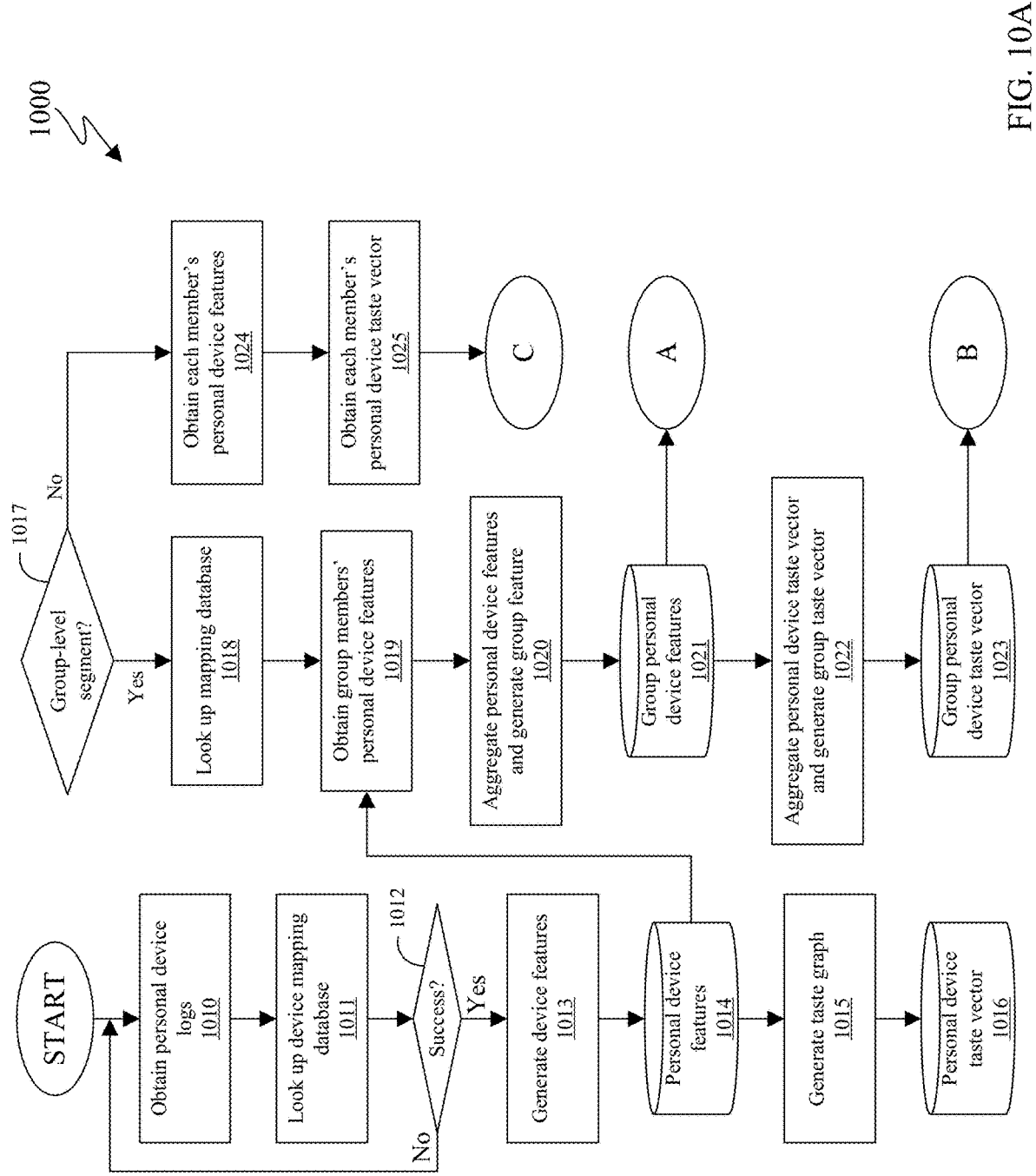
FIGS. 10A through 10G illustrate an example process for segment generation using machine learning models in accordance with this disclosure.
Figure 10C:
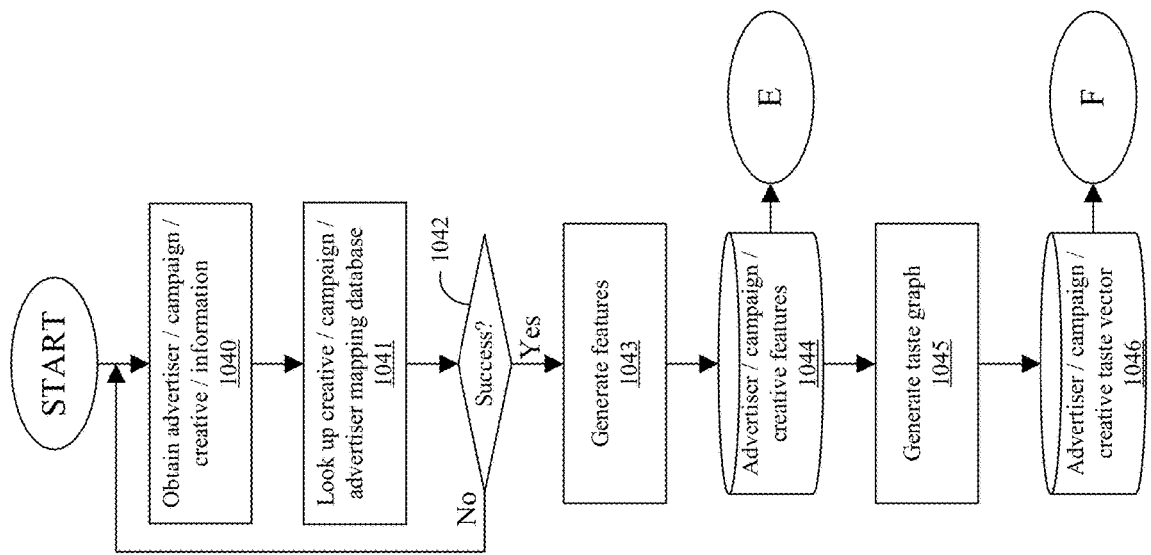
Figure 10B:
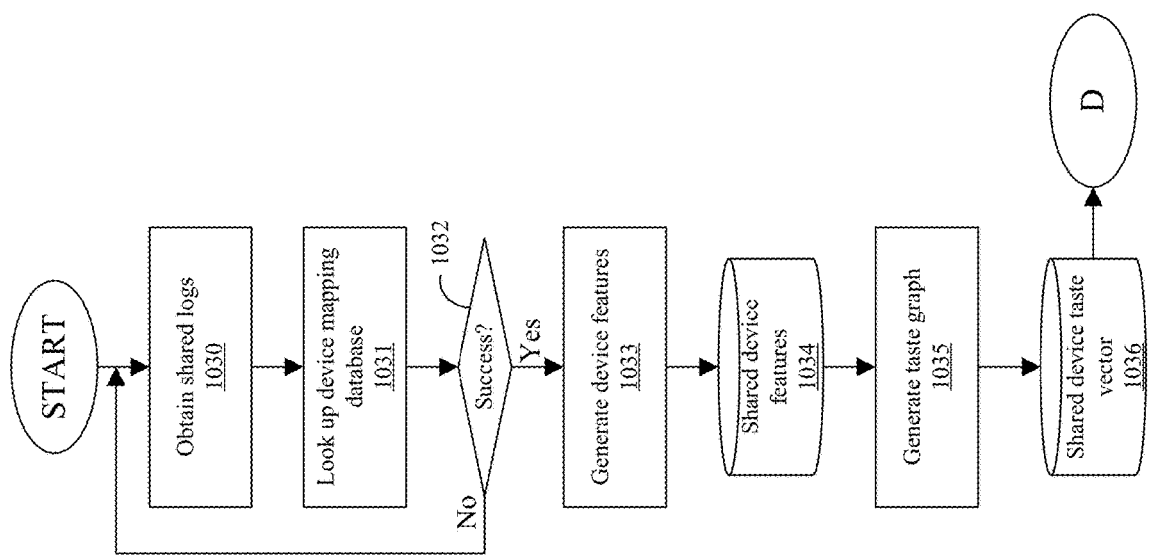

As shown in FIG. 10B, feature generation for shared devices is performed. At step 1030, shared device logs are obtained. In some cases, the shared device logs can be obtained using the data 302, the personal device data 304, and the shared device data 306 of FIG. 3A. As a particular example, the shared device logs can indicate that some user used a specific application at a specific time on a shared device. The shared device logs can also indicate that some user on a shared device used a specific application for a specific duration. The device mapping database is accessed at step 1031, and a determination is made whether a suitable mapping in the device mapping database is successfully found at step 1032. In response to a determination that a suitable mapping in the device mapping database was not successfully found, the process returns to step 1030.

In response to a determination that a suitable mapping in the device mapping database was successfully found, shared device features are generated at step 1033. In some cases, the shared device features can be generated by the device feature generator 316 of FIG. 3A. The generated device features are stored in a shared device feature database or other location(s) at step 1034. At step 1035, a taste graph is generated. In some cases, the taste graph can be generated using the taste graph generator 318 of FIG. 3A. A shared device taste vector generated for the shared device is saved in a database or other location(s) at step 1036. In some cases, the shared device taste vector can represent one of the shared device taste vectors 356a-356m.

As shown in FIG. 10C, feature generation for advertisers, campaigns, and creatives is performed. At step 1040, information associated with an advertiser, a campaign, a creative, or a combination thereof is obtained. In some cases, the information can be obtained from the advertiser information 320 of FIG. 3A. As particular examples, the advertiser information can indicate that a specific campaign ID obtained a certain bid price at a certain date/time. The advertiser information can also indicate a description that corresponds to a specific campaign ID. A creative/campaign/advertiser mapping database is accessed at step 1041, and a determination is made whether a suitable mapping in the creative/campaign/advertiser mapping database is successfully found at step 1042. The creative/campaign/advertiser mapping database can associate one or more specific campaigns to each advertiser and associate one or more specific creatives to each campaign. In response to a determination that a suitable mapping in the creative/campaign/advertiser mapping database was not successfully found, the process returns to step 1040.

In response to a determination that a suitable mapping in the creative/campaign/advertiser mapping database was successfully found, advertisement, campaign, and creative features are generated at step 1043. In some cases, the features can be generated by the advertisement feature generator 324 of FIG. 3A. The generated features are saved in a database or other location(s) at step 1044. At step 1045, a taste graph is generated. In some cases, the taste graph can be generated using the taste graph generator 318 of FIG. 3A. Advertising-related taste vectors that are generated are stored in a database or other location(s) at step 1046.

Figure 10D:
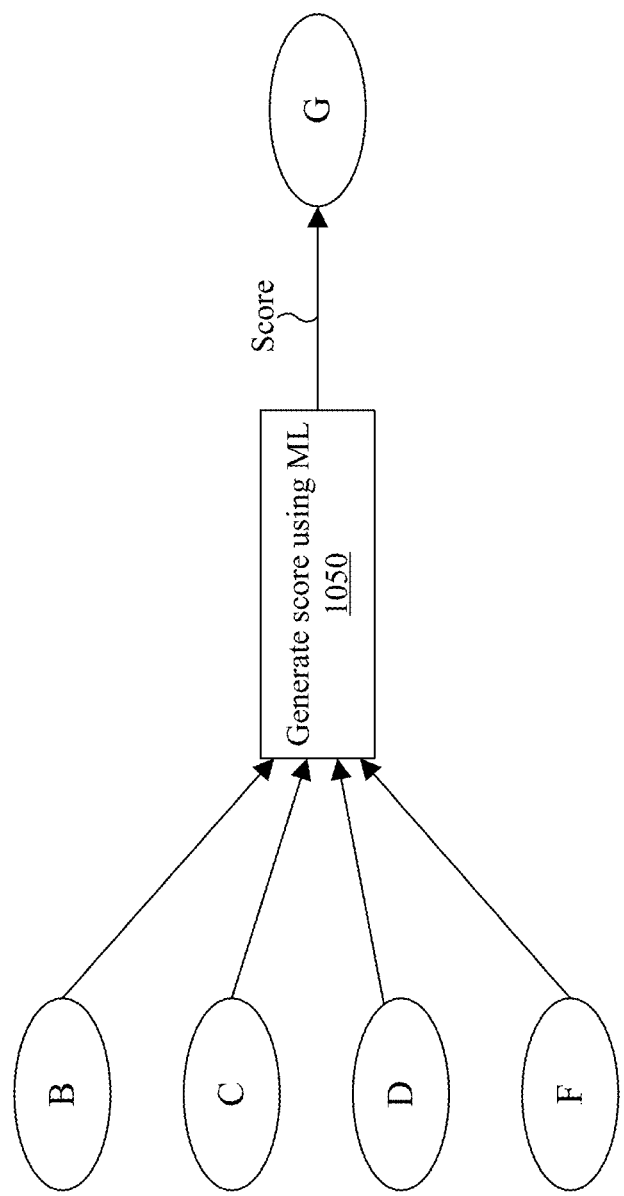

As shown in FIG. 10D, various data is provided to a trained machine learning model, which is trained to process the data and generate a score at step 1050. In this example, the inputs to the machine learning model include (i) the group personal device taste vector, (ii) each member's personal device taste vector, (iii) the shared device taste vector, and (iv) the advertisement, campaign, and creative taste vectors. In some cases, the machine learning model used in step 1050 can be used to implement the taste match layer operation 370 of FIG. 3C. The score generated by the machine learning model at step 1050 can be the same as or similar to the score described in the example of FIGS. 7A and 7B.

Figure 10E:
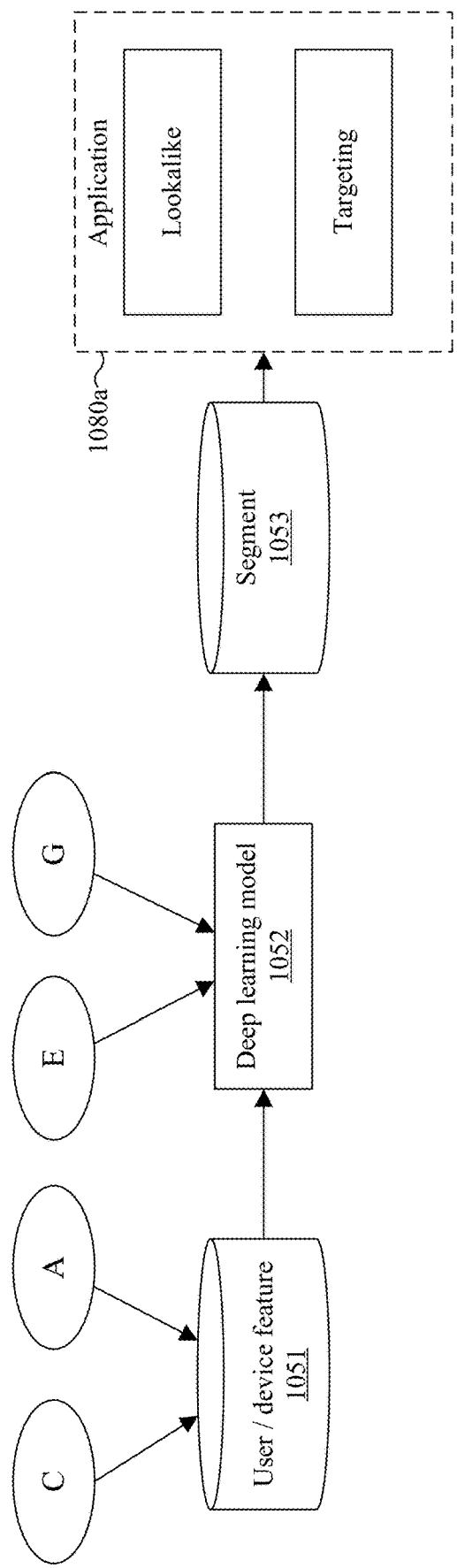
Figure 10F:
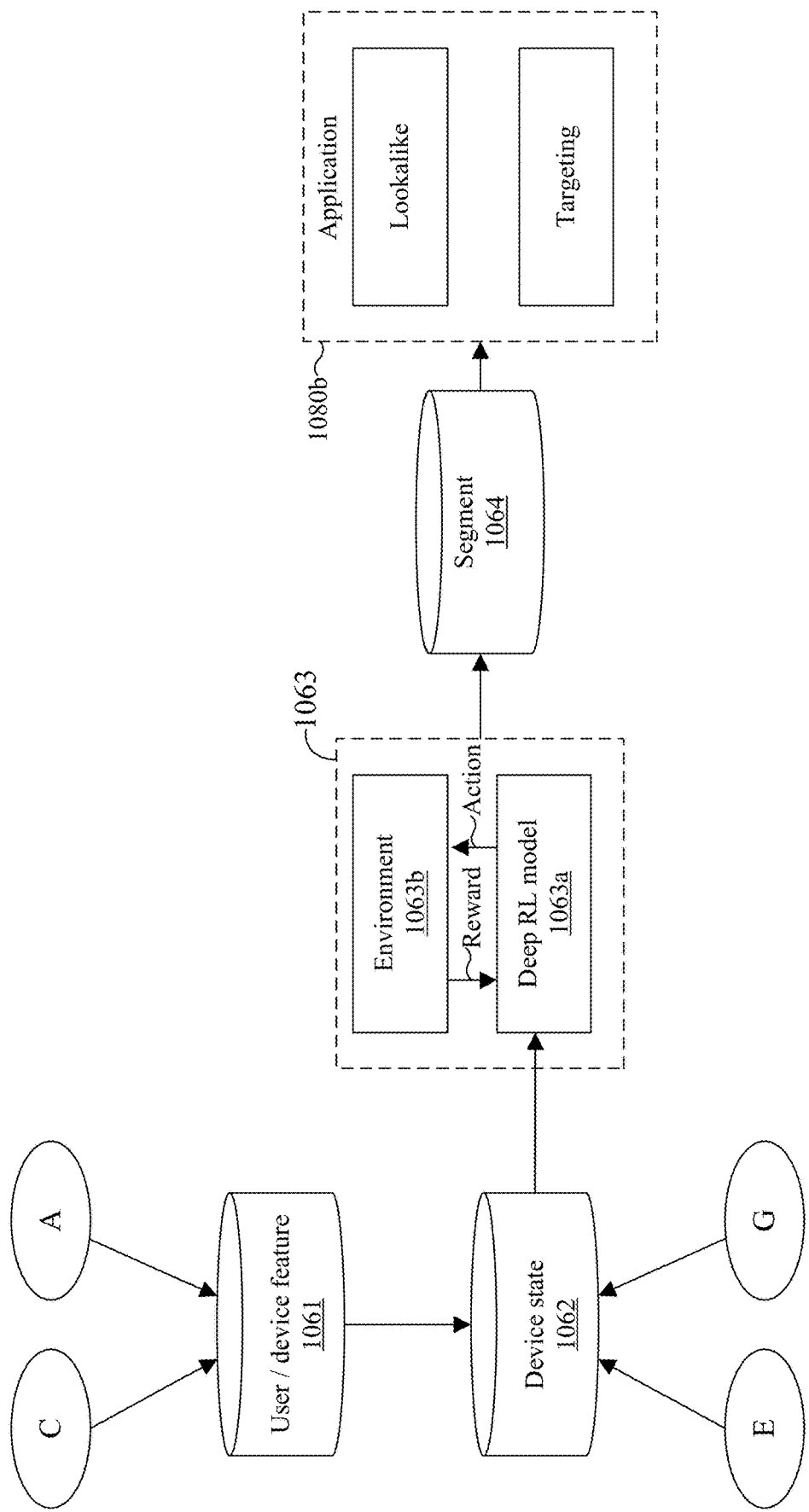
Figure 10G:
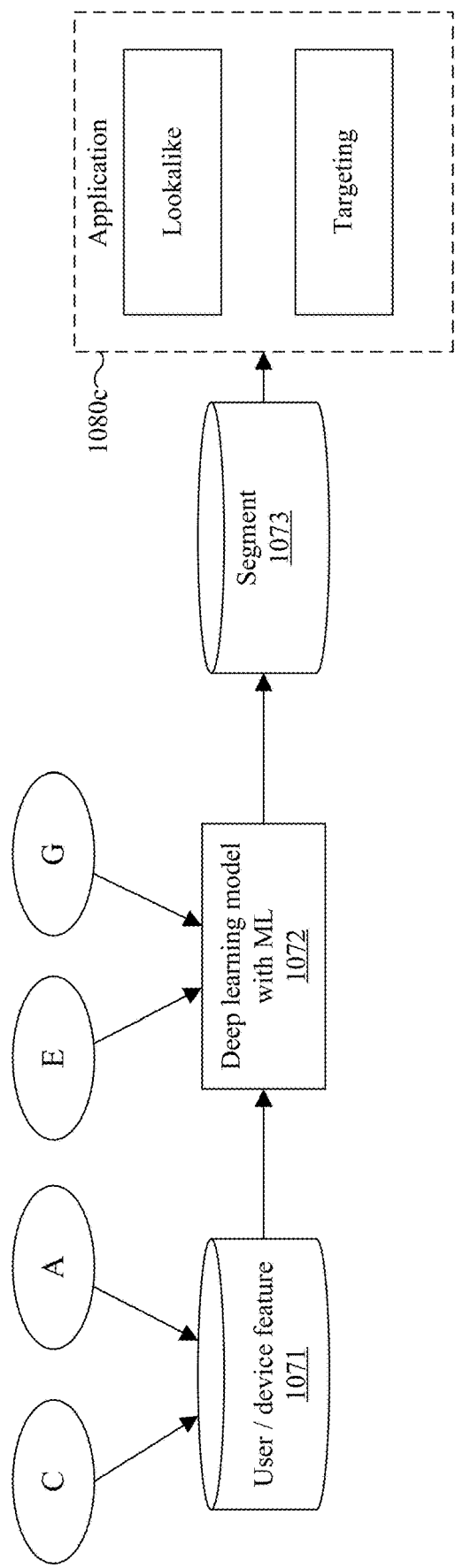

FIGS. 10E, 10F, and 10G illustrate different machine learning operations that may be used to identify an advertisement, campaign, or creative to be provided to a personal device, shared device, or user. In particular, FIG. 10E illustrates the use of a deep learning model, FIG. 10F illustrates the use of a deep reinforced learning model, and FIG. 10G illustrates the use of a deep learning model with multi-instance learning.

As shown in FIG. 10E, a deep learning model is used to identify an advertisement, campaign, or creative to be provided to a personal device, shared device, or user. At step 1051, a database that includes user and device features is generated. The database may include group device features (such as those saved at step 1021) and each member's personal device features (such as those saved at step 1025). At step 1052, a deep learning model obtains the user and device features, as well as advertiser, campaign, and creative features (such as those stored at step 1044). The deep learning model also obtains the score generated at step 1050. The deep learning model identifies one or more segments, which may be stored in a segment database or other location(s), at step 1053. An application 1080a can use the one or more identified segments to provide one or more advertisements to one or more selected devices.

As shown in FIG. 10F, a reinforced deep learning model is used to identify an advertisement, campaign, or creative to be provided to a personal device, shared device, or user. At step 1061, a database that includes user and device features is generated. The database may include group device features (such as those saved at step 1021) and each member's personal device features (such as those saved at step 1025). At step 1062, a database that represents the state of an electronic device is generated. For example, the database can include (i) the user and device features, (ii) the advertiser, campaign, and creative features, and (iii) the score generated at step 1050. A deep reinforced machine learning model obtains the information about the device state at step 1063. Here, the machine learning model uses a model 1063a associated with an environment 1063b. A state (which includes various features) is provided to the model 1063a, and the environment 1063b determines whether the output of the model 1063a constitutes a good output. The environment 1063b provides a reward to the model 1063a, where the reward can be a positive reward or a negative reward. The model 1063a identifies one or more segments, which may be stored in a segment database or other location(s), at step 1064. An application 1080b can use the one or more identified segments to provide one or more advertisements to one or more selected devices.

As shown in FIG. 10G, a deep learning model with multiple instance learning is used to identify an advertisement, campaign, or creative to be provided to a personal device, shared device, or user. At step 1071, a database that includes user and device features is generated. The database may include group device features (such as those saved at step 1021) and each member's personal device features (such as those saved at step 1025). At step 1072, a deep learning model obtains the user and device features included in the database, as well as advertiser, campaign, and creative features and the score generated at step 1050. The machine learning model identifies one or more segments, which may be stored in a segment database or other location(s), at step 1073. An application 1080c can use the one or more identified segments to provide one or more advertisements to one or more selected devices.

Although FIGS. 10A through 10G illustrate one example of a process 1000 for segment generation using machine learning models, various components shown in FIGS. 10A through 10G can be added, omitted, combined, further subdivided, replicated, or placed in any other suitable configuration according to particular needs. Also, depending on the implementation, the process 1000 may use any suitable machine learning model(s) to perform one or more functions of the process 1000.

Figure 11A:
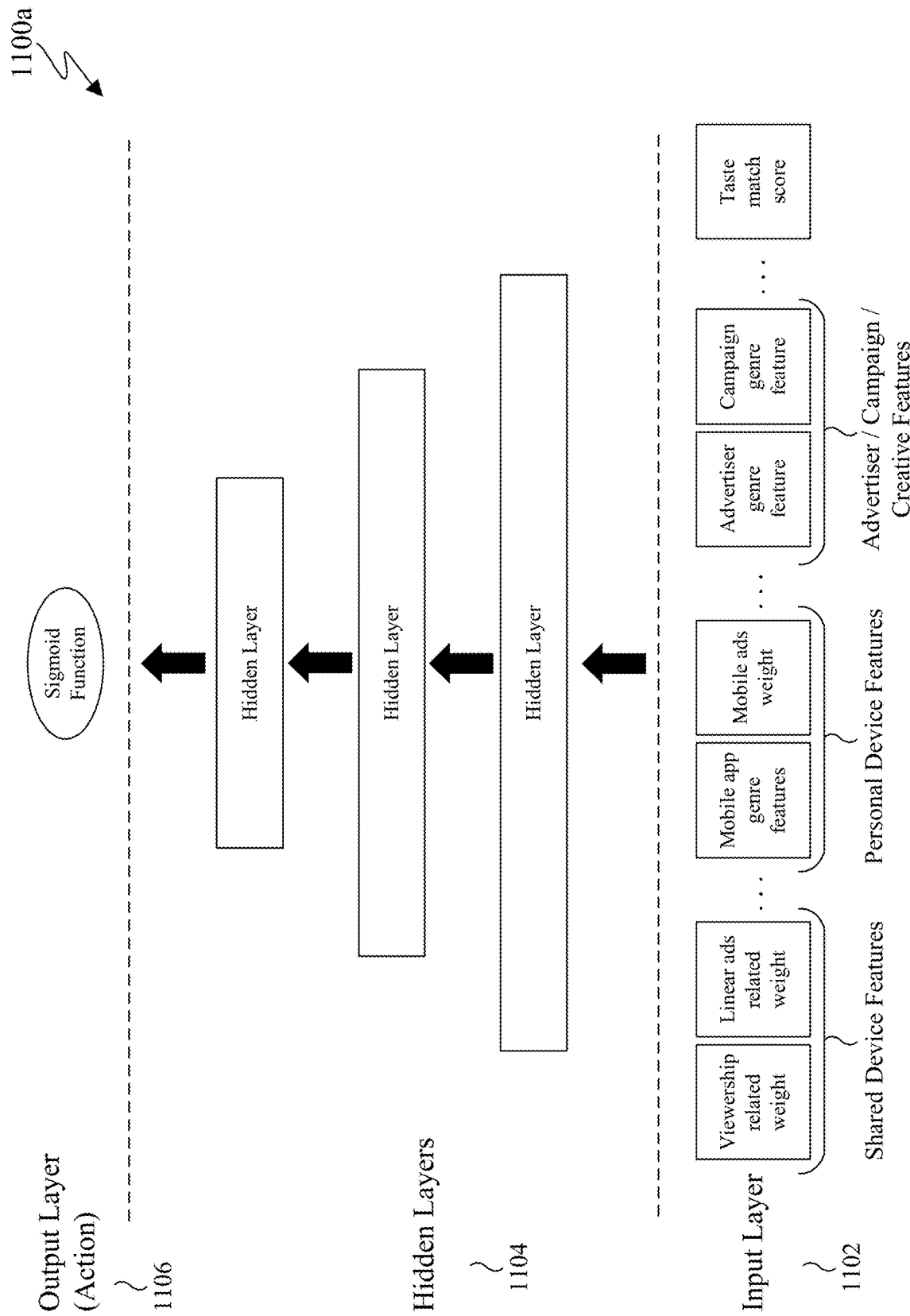
FIGS. 11A through 11C illustrate example deep learning models in accordance with this disclosure.
Figure 11B:
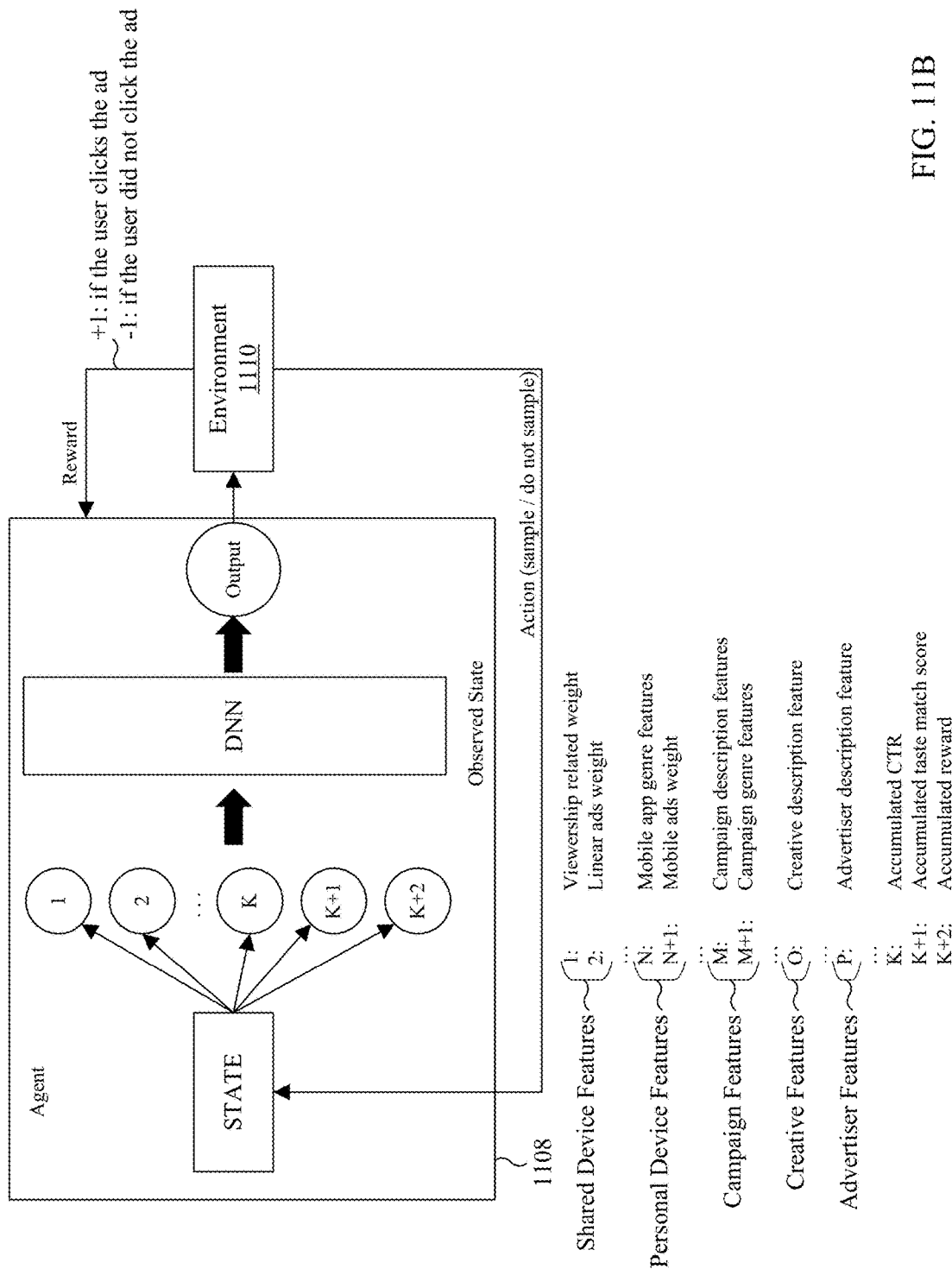
Figure 11C:
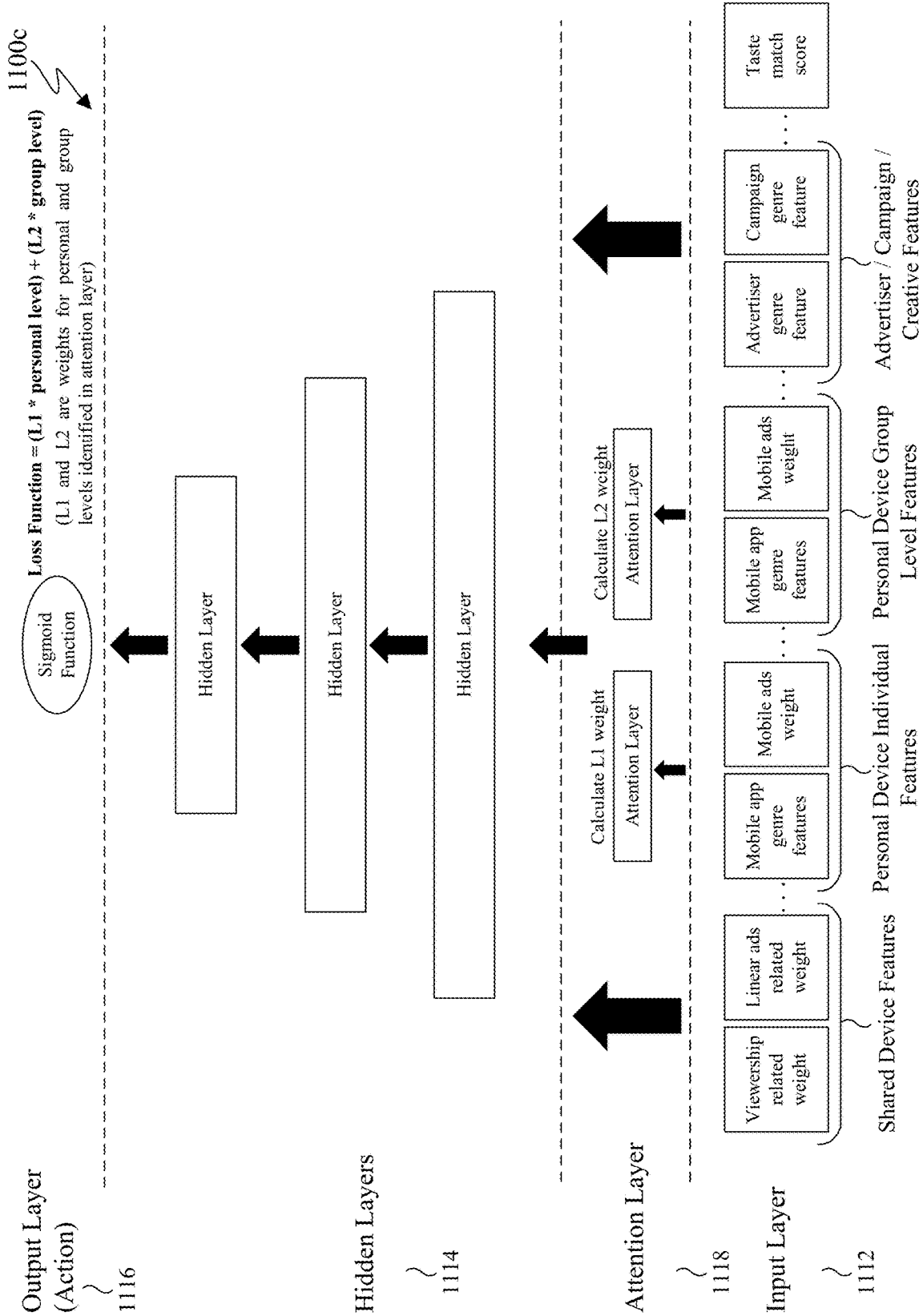

FIGS. 11A through 11C illustrate example deep learning models in accordance with this disclosure. More specifically, FIG. 11A illustrates an example deep learning model 1100a that could be used in FIG. 10E, FIG. 11B illustrates an example deep reinforced learning model 1100b that could be used in FIG. 10F, and FIG. 11C illustrates an example deep learning model with multi-instance learning 1100c that could be used in FIG. 10G.

In FIG. 11A, the deep learning model 1100a may represent any suitable deep learning model architecture, such as a fully connected network (FCN), a CNN, or any other suitable structure. Here, the deep learning model 1100a includes an input layer 1102, multiple hidden layers 1104, and an output layer 1106. The input layer 1102 receives various features, such as shared device features, personal device features, and advertiser/campaign/creative features, and taste match scores. The hidden layers 1104 are used by the deep learning model 1100a to process the inputs from the input layer 1102 and identify at least one advertising segment that is suitable for presentation to one or more users. In some cases, the output layer 1106 can use a sigmoid function or other function to process the output of the final hidden layer 1104 and identify one or more segments (such as during step 1053 of the process 1000). For example, the sigmoid function could be set to a value of 0.5 or another threshold. In this example, if the value that is output from the final hidden layer 1104 for a particular segment is greater than the threshold, the particular segment is selected for possible presentation to one or more users. Otherwise, the segment is not selected.

In FIG. 11B, the deep reinforced learning model 1100b is associated with an agent 1108 (such as the model 1063a) and an environment 1110 (such as the environment 1063b). The agent 1108 inputs a state (which includes various features like shared device features, personal device features, and advertiser/campaign/creative features). The environment 1110 determines whether the output of the agent 1108 was a good output, and the environment 1110 may provide a reward to the agent 1108 based on the output. For instance, the reward can be a positive reward or a negative reward, and the reward can be based on whether a user clicked on or otherwise selected a provided advertisement. The environment 1110 also provides the action that the agent 1108 decided upon back to the state.

In FIG. 11C, the deep learning model with multi-instance learning 1100c includes an input layer 1112, multiple hidden layers 1114, and an output layer 1116. These layers may be the same as or similar to corresponding layers in FIG. 11A described above. Here, the deep learning model with multi-instance learning 1100c also includes an attention layer 1118. In some embodiments, the deep learning model with multi-instance learning 1100c can analyze individual and group personal devices together. Here, the input layer 1112 obtains features such as shared device features, personal device features at the individual level, personal device features at the group level, advertiser/campaign/creative features, and taste match scores. The attention layer 1118 can generate a weight for the personal device features at the individual level and another weight for the personal device features at the group level. The hidden layers 1114 process the weighted features, and the output layer 1116 can identify at least one advertising segment that is suitable for presentation to one or more users. In some cases, the output layer 1116 can include a loss function that uses the weights generated by the attention layer 1118.

Although FIGS. 11A through 11C illustrate examples of deep learning models, various changes may be made to FIGS. 11A through 11C. For example, the various processes described above may use any other suitable deep learning model architectures or other machine learning model architectures.

Figure 12A:
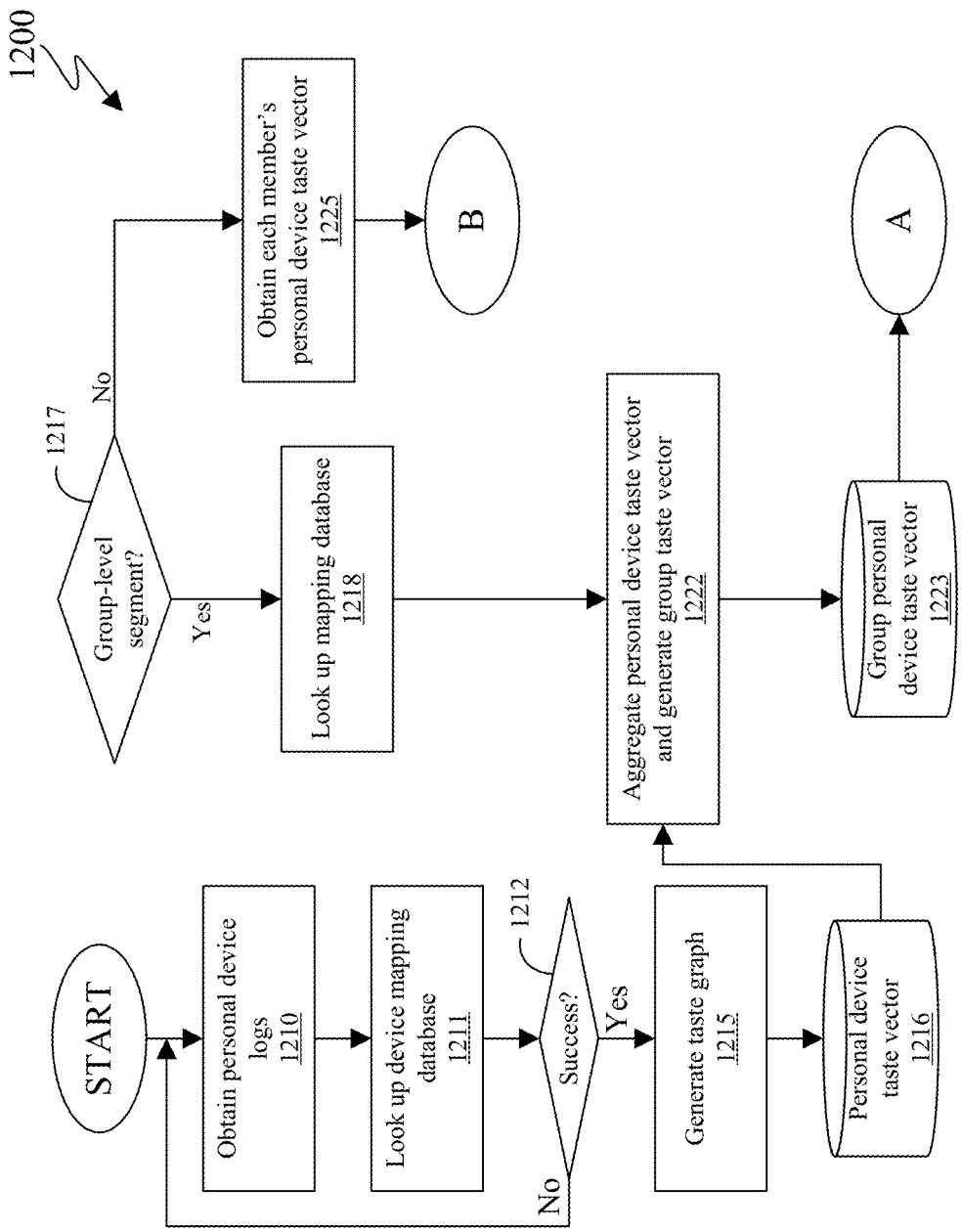
FIGS. 12A and 12B illustrate an example process for segment generation using Monte Carlo analysis in accordance with this disclosure.
Figure 12B:
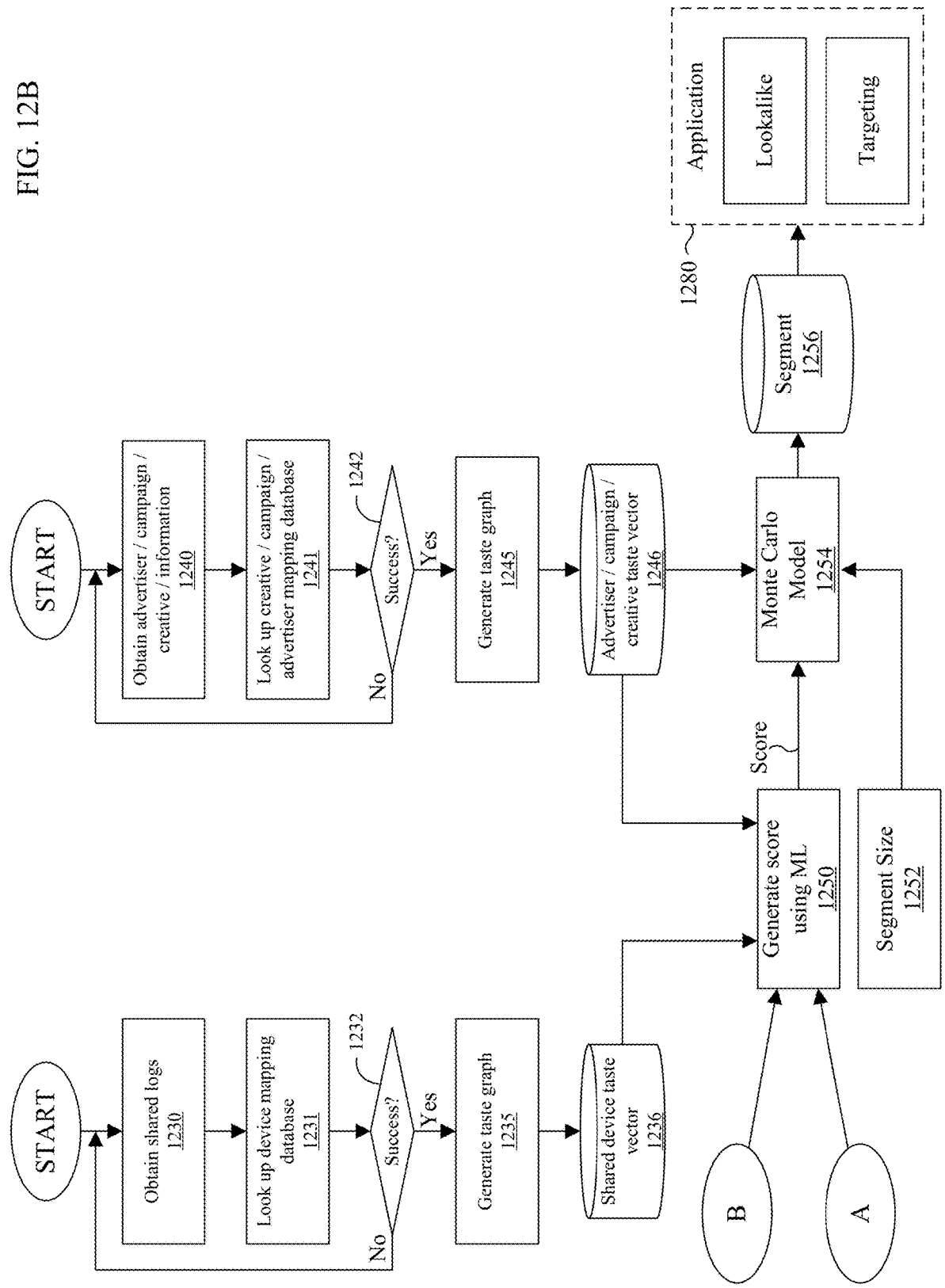

FIGS. 12A and 12B illustrate an example process 1200 for segment generation using Monte Carlo analysis in accordance with this disclosure. For ease of explanation, the process 1200 of FIGS. 12A and 12B may be described as being performed by the server 106 in the network configuration 100 of FIG. 1. However, the process 1200 of FIGS. 12A and 12B may be performed by any other suitable device(s) and in any other suitable system(s), such as when performed by the electronic device 101.

At step 1210, personal device logs are obtained. In some cases, the personal device logs can be obtained using the data 302 and the personal device data 304 of FIG. 3A. As a particular example, the personal device logs can indicate that a user used a specific application at a specific time. The personal device logs can also indicate that a user used a specific application for a specific duration. A device mapping database is accessed at step 1211, and a determination is made whether a suitable mapping in the device mapping database is successfully found at step 1212. In response to a determination that a suitable mapping in the device mapping database was not successfully found, the process returns to step 1210. In response to a determination that a suitable mapping in the device mapping database was successfully found, a taste graph is generated at step 1215. For instance, the taste graph can be generated by the taste graph generator 318 of FIG. 3A. A personal device taste vector generated for the device is saved in a database or other location(s) at step 1216. In some cases, the personal device taste vector can represent one of the personal device taste vectors 354a-354k.

At step 1217, a determination is made whether group-level segmentation is to be performed. If so, a mapping database is accessed at step 1218. The mapping database can be used to associate different individual members with a group and may include the personal device features of the group members (as determined previously). At step 1222, personal device taste vectors for the group members are aggregated to generate a group personal device taste vector, and the generated group personal device taste vector is stored in a database or other location(s) at step 1223. In response to a determination not to use group-level segmentation, individual users' personal taste vectors are obtained at step 1225.

As shown in FIG. 12B, feature generation for shared devices is performed. At step 1230, shared device logs are obtained. In some cases, the shared device logs can be obtained using the data 302, the personal device data 304, and the shared device data 306 of FIG. 3A. As a particular example, the shared device logs can indicate that some user used a specific application at a specific time on a shared device. The shared device logs can also indicate that some user on a shared device used a specific application for a specific duration. The device mapping database is accessed at step 1231, and a determination is made whether a suitable mapping in the device mapping database is successfully found at step 1232. In response to a determination that a suitable mapping in the device mapping database was not successfully found, the process returns to step 1230. In response to a determination that a suitable mapping in the device mapping database was successfully found, a taste graph is generated at step 1235. In some cases, the taste graph can be generated using the taste graph generator 318 of FIG. 3A. A shared device taste vector generated for the device is saved in a database or other location(s) at step 1236. In some cases, the shared device taste vector can represent one of the shared device taste vectors 356a-356m.

Feature generation for advertisers, campaigns, and creatives is also performed. At step 1240, information associated with an advertiser, a campaign, a creative, or a combination thereof is obtained. In some cases, the information can be obtained from the advertiser information 320 of FIG. 3A. As particular examples, the advertiser information can indicate that a specific campaign ID obtained a certain bid price at a certain date/time. The advertiser information can also indicate a description that corresponds to a specific campaign ID. A creative/campaign/advertiser mapping database is accessed at step 1241, and a determination is made whether a suitable mapping in the creative/campaign/advertiser mapping database is successfully found at step 1242. In response to a determination that a suitable mapping in the creative/campaign/advertiser mapping database was not successfully found, the process returns to step 1240. In response to a determination that a suitable mapping in the creative/campaign/advertiser mapping database was successfully found, a taste graph is generated at step 1245. In some cases, the taste graph can be generated using the taste graph generator 318 of FIG. 3A. Advertising-related taste vectors that are generated are stored in a database or other location(s) at step 1246.

Various data is provided to a trained machine learning model, which is trained to process the data and generate a score at step 1250. In this example, the inputs to the machine learning model include (i) the group personal device taste vector, (ii) each member's personal device taste vector, (iii) the shared device taste vector, and (iv) the advertisement, campaign, and creative taste vectors. In some cases, the machine learning model used in step 1250 can be used to implement the taste match layer operation 370 of FIG. 3C. The score generated by the machine learning model at step 1250 can be the same as or similar to the score described in the example of FIGS. 7A and 7B.

The generated score and a segment size 1252 are provided as inputs to a Monte Carlo model at step 1254. The segment size 1252 indicates how big or how small advertising segments to be identified by the Monte Carlo model should be. In some cases, the segment size 1252 may be expressed as a particular size/duration or a range of sizes/durations. The Monte Carlo model also receives the advertisement, campaign, and creative tastes vectors stored at step 1246. The Monte Carlo model can perform Monte Carlo simulations to select which segments may be most acceptable to users. For example, in some cases, the Monte Carlo model may determine a sum of all of the devices' and users' scores based on the following.

$$\text{Total\_Score} = \sum_{d=1}^{D} Score_u \quad (16)$$

Here, D is the number of users or devices in a household or other group, Score is a taste match score, and u is a particular user or device. After determining the sum of all of the devices' and users' scores, the Monte Carlo model may determine a ratio for each device. In some cases, the ratio may represent the score of each user divided by the total of all scores, which may be expressed as follows.

$$\text{User\_Score\_By\_Total} = \left[ \frac{Score_1}{\text{Total\_Score}}, \frac{Score_2}{\text{Total\_Score}}, \dots, \frac{Score_D}{\text{Total\_Score}} \right] \quad (17)$$

After determining the ratio, the Monte Carlo model may randomly choose devices based on the ratio. For example, in some cases, the Monte Carlo model may use the following to identify devices for sampling.

numpy.random.choice(candidate_list,sample_size, probability_list=User_Score_By_Total)

Here, candidate_list represents the list of possible candidate devices and can be based on the total devices and users in the household or other group, where:

$$0 \leq \text{sample\_size} \leq \text{household\_size} \quad (18)$$

If the Monte Carlo model selects one or more segments, the segment(s) can be stored in a database or other location(s) at step 1256. An application 1280 can use the one or more identified segments to provide one or more advertisements to one or more selected devices.

Although FIGS. 12A and 12B illustrate one example of a process 1200 for segment generation using Monte Carlo analysis, various changes may be made to FIGS. 12A and 12B. For example, various components shown in FIGS. 12A and 12B can be added, omitted, combined, further subdivided, replicated, or placed in any other suitable configuration according to particular needs. Also, depending on the implementation, the process 1200 may use any suitable machine learning model(s) to perform one or more functions of the process 1200.

It should be noted that the functions shown in or described with respect to FIGS. 3A through 12B can be implemented in an electronic device 101, server 106, or other device(s) in any suitable manner. For example, in some embodiments, at least some of the functions shown in or described with respect to FIGS. 3A through 12B can be implemented or supported using one or more software applications or other software instructions that are executed by the processor(s) 120 of the electronic device 101, server 106, and/or other device. In other embodiments, at least some of the functions shown in or described with respect to FIGS. 3A through 12B can be implemented or supported using dedicated hardware components. In general, the functions shown in or described with respect to FIGS. 3A through 12B can be performed using any suitable hardware or any suitable combination of hardware and software/firmware instructions. Also, the functions shown in or described with respect to FIGS. 3A through 12B can be performed by a single device or by multiple devices.

Figure 13:
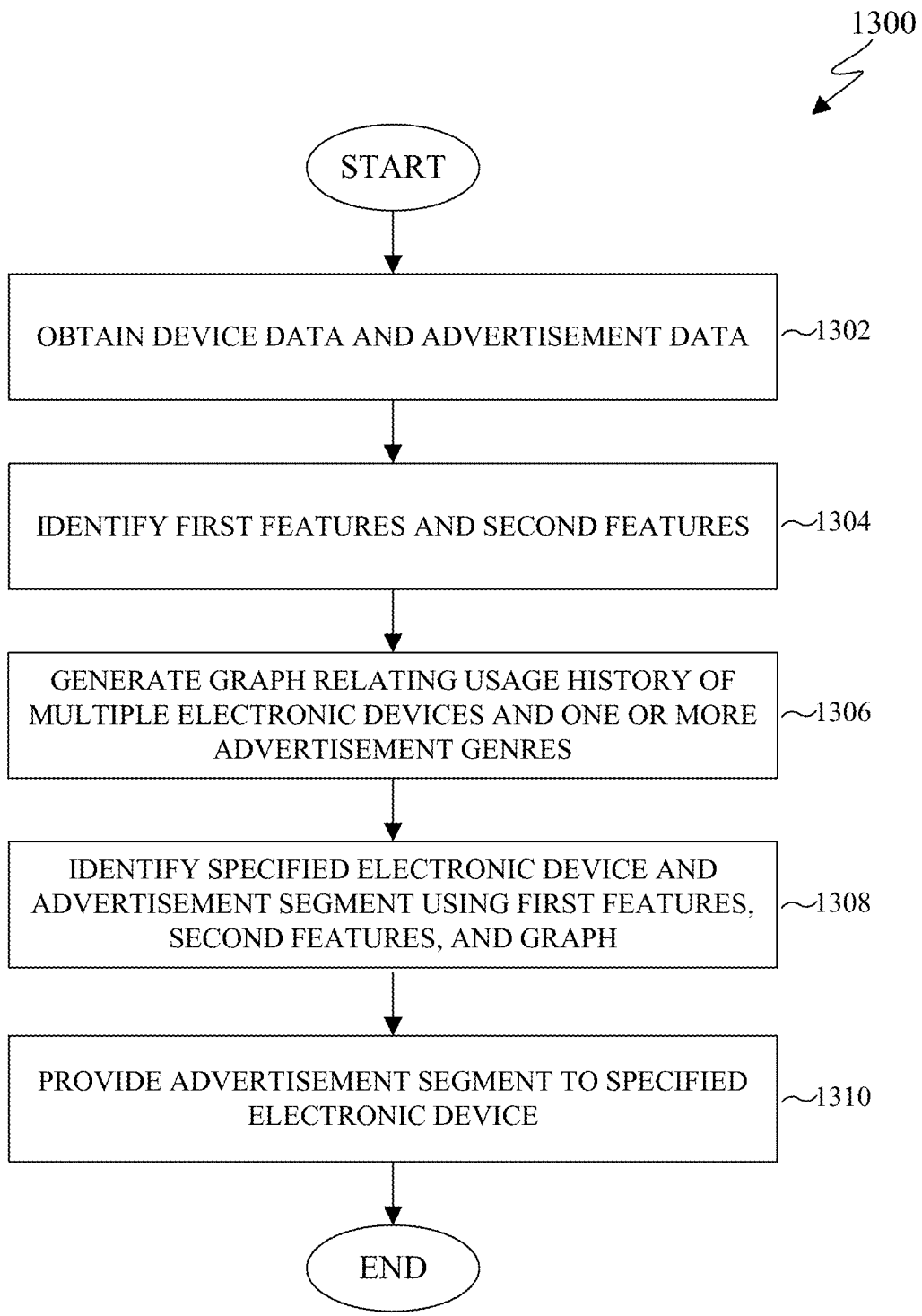
FIG. 13 illustrates an example method for segment generation in accordance with this disclosure.

FIG. 13 illustrates an example method 1300 for segment generation in accordance with this disclosure. For ease of explanation, the method 1300 of FIG. 13 is described as being performed by or involving the use of the electronic device 101 and the server 106 in the network configuration 100 of FIG. 1. However, the method 1300 could be used with any other suitable device(s) and in any other suitable system(s).

At step 1302, the server 106 obtains device data and advertisement data. The device data can be associated with multiple electronic devices and include personal device data and shared device data. The personal device data may include a usage history from at least one of the electronic devices associated with a specified user. The shared device data may include a usage history from at least one of the electronic devices associated with multiple users including the specified use. The advertisement data can be associated with one or more advertisement campaigns and may include advertisement information and target user information. The advertisement information could include information associated with one or more advertisement campaigns and information associated with one or more creatives. The target user information can be used to identify one or more targeted users and one or more targeted devices for each of the one or more creatives.

At step 1304, the server 106 identifies first features and second features. The first features may correspond to the device data, while the second features may correspond to the advertisement data. In some embodiments, the server 106 encodes the device data to generate the first features and encodes the advertisement data to generate the second features. At step 1306, the server 106 generates a graph relating the usage history of the multiple electronic devices and one or more advertisement genres. For example, to generate the graph, the server 106 may generate multiple sub-scores by normalizing the usage history associated with each of the one or more advertisement genres for each of the multiple electronic devices. The server 106 may also generate a score indicating the usage history of a user associated with the multiple electronic devices by averaging or otherwise combining a portion of the multiple sub-scores that correspond to one of the one or more advertisement genres. In some cases, the multiple sub-scores and the score can be included in the graph.

At step 1308, the server 106 identifies a specified electronic device and an advertisement segment using the first features, the second features, and the graph. In some embodiments, the specified electronic device and the specified advertisement may be identified based on a deep learning analysis, a deep reinforced learning analysis, a Monte Carlo analysis, and/or a deep learning analysis with multiple instances of learning. Also, in some embodiments, the advertisement segment may be identified by determining, using a neural network or other machine learning model, the specified electronic device to provide the advertisement segment. At step 1310, the server 106 provides the advertisement segment to the specified electric device. For example, the advertisement segment may be provided to the electronic device 101 for presentation to at least one user. In some cases, after obtaining an indication that a user interacted with the advertisement segment provided to the specified electronic device, a reward can be provided to the neural network or other machine learning model.

Although FIG. 13 illustrates one example of a method 1300 for segment generation, various changes may be made to FIG. 13. For example, while shown as a series of steps, various steps in FIG. 13 may overlap, occur in parallel, occur in a different order, or occur any number of times.

Note that the features and functions described above may be used in various use cases to provide desired functionality in specific applications. The following provides several examples of these use cases and applications. However, the features and functions described above may be used in any other suitable manner.

In a first example use case, the features and functions described above may be used for TV campaign targeting (such as in TVPLUS applications) for family members or other household members. In this use case, TV campaign segments may be ideally provided for all household members. Here, TV features and each household member's smartphone features can be aggregated and used toform household personal device features. The TV features, household personal device features, and advertiser/campaign/creative features can be input to a machine learning model so that the machine learning model can predict if the household members will enjoy or want to watch a specific TV campaign. If so, the TV campaign can be impressed to the household's TV or TV app.

In a second example use case, the features and functions described above may be used for cross-device advertisement targeting for family or other household members. In this use case, cross-device text-based creative segments may be ideally provided for all household members. Here, TV features and each household member's smartphone features can be aggregated and used toform household personal device features. Taste graphs can be generated for the household TV or TV app and each family member's personal device(s), and the taste graphs can be aggregated toform a household taste graph. Using the household taste graph, similar creatives can be identified based on a creative text description and advertiser, and the creative features of those similar creatives can be identified. The TV features, household personal device features, and similar creative features can be input to a machine learning model (along with taste match scores) so that the machine learning model can predict if the household members will click or otherwise select one or more cross-device text-based creatives. If so, the one or more cross-device text-based creatives can be impressed to the household's smartphones.

In a third example use case, the features and functions described above may be used for cross-device video-based advertisement targeting individual family members or other household members. In this use case, cross-device video-based creative segments may be ideally provided for one or more household members. Here, TV features and each household member's smartphone features can be used toform taste graphs. The taste graphs and advertiser/campaign/creative features (along with taste match scores) can be input to a machine learning model so that the machine learning model can predict if the individual household members will click or otherwise select one or more cross-device video-based creatives. If so, the one or more cross-device video-based creatives can be impressed to the household's smartphones.

In a fourth example use case, the features and functions described above may be used for providing "lookalike" TV advertisements or other marketing. After a TV campaign target segment is generated (such as by using the first use case above), the target segment can be expanded, such as by performing a nearest neighbor search and measuring similarities of the originally-generated group's user features and other groups' user features. The same or similar target segment may then be provided to the TV, TV app, smartphones, or other devices of the other groups having similar user features.

In a fifth example use case, the features and functions described above may be used for providing "lookalike" cross-device advertisement targeting. After a cross-device campaign target segment is generated (such as by using the second or third use case above), the target segment can be expanded, such as by performing a nearest neighbor search and measuring similarities of the originally-generated group's user features and other groups' user features. The same or similar target segment may then be provided to the TV, TV app, smartphones, or other devices of the other groups having similar user features.

Again, note that these use cases and applications are examples only. The features and functions described above may be used in any other suitable manner, and the features and functions described above are therefore not limited by the previous use cases and applications.

Although the present disclosure has been described with reference to various example embodiments, various changes and modifications may be suggested to one skilled in the art. It is intended that the present disclosure encompass such changes and modifications as fall within the scope of the appended claims.

What is claimed is:

1. A method comprising:
   obtaining (i) device data associated with multiple electronic devices and (ii) advertisement data associated with one or more advertisement campaigns;
   identifying first features and second features, the first features corresponding to the device data, the second features corresponding to the advertisement data, wherein the first features are identified using one hot encoding;
   generating a first graph relating usage history of the multiple electronic devices and one or more advertisement genres;
   generating multiple sub-scores by normalizing the usage history associated with each of the one or more advertisement genres for each of the multiple electronic devices;
   generating a first score indicating the usage history of a specified user associated with the multiple electronic devices by combining at least a portion of the multiple sub-scores that correspond to one of the one or more advertisement genres;
   generating a second graph relating interactions of the specified user on at least one of the multiple electronic devices with the one or more advertisement genres;
   generating additional sub-scores by normalizing the interactions associated with each of the one or more advertisement genres for each of the multiple electronic devices;
   generating a second score indicating the interactions of the specified user with the multiple electronic devices by combining at least a portion of the additional sub-scores that correspond to one of the one or more advertisement genres;
   generating a weighted score based on the first score and the second score, the weighted score indicating whether the specified user is inclined to interact with an advertisement segment from among the one or more advertisement campaigns;
   identifying a specified electronic device from among the multiple electronic devices and the advertisement segment using the first features, the second features, the weighted score, and the first graph; and
   providing the advertisement segment to the specified electronic device;
   wherein identifying the specified electronic device comprises determining, using a neural network implementing a reinforced deep learning model, the specified electronic device to provide the advertisement segment, wherein the specified electronic device is associated with an output of a final hidden layer of the reinforced deep learning model exceeding a threshold value of a sigmoid function; and
   wherein a reward is provided to the neural network after obtaining an indication that the specified user interacted with the advertisement segment provided to the specified electronic device.

2. The method of claim 1, wherein:
   each of the one or more advertisement campaigns includes one or more creatives;
   the device data includes personal device data and shared device data, the personal device data including the usage history from at least one of the electronic devices associated with the specified user, the shared device data including the usage history from at least two of the electronic devices associated with multiple users including the specified user; and
   the advertisement data includes advertisement information and target user information, the advertisement information including (i) information associated with the one or more advertisement campaigns and (ii) information associated with the one or more creatives, the target user information identifying targeted users or targeted devices for each of the one or more creatives.

3. The method of claim 2, further comprising:
   encoding the advertisement information and the target user information to generate the second features; and
   generating the second graph based on the second features by aggregating the second features associated with an advertiser.

4. The method of claim 1, wherein the specified electronic device is identified based on at least one of: a Monte Carlo analysis and a deep learning analysis with multiple instances of learning.

5. The method of claim 1, wherein the second features are generated using at least one of: one hot encoding and word2vec encoding.

6. The method of claim 1, wherein the specified electronic device is identified based on a Monte Carlo analysis, the Monte Carlo analysis comprising:
   determining, for a first set of users and devices, a taste match score for each pairing of user and device;
   determining, for each device, a ratio of taste match score for a user compared to a total of taste match scores for all devices of the first set of users and devices;
   selecting, based on the ratio, a set of candidate devices for simulation; and
   performing a Monte Carlo simulation using the selected set of candidate devices.

7. The method of claim 1, wherein:
   the specified electronic device is identified based on a deep learning analysis with multiple instances of learning; and
   the reinforced deep learning model comprises an attention layer, the attention layer configured to provide weights for the first features at a device level and at a group level.

8. An electronic device comprising:
   at least one processing device configured to:
      obtain (i) device data associated with multiple electronic devices and (ii) advertisement data associated with one or more advertisement campaigns;
      identify first features and second features, the first features corresponding to the device data, the second features corresponding to the advertisement data, wherein the first features are identified using one hot encoding;
      generate a first graph relating usage history of the multiple electronic devices and one or more advertisement genres;

generate multiple sub-scores by normalizing the usage history associated with each of the one or more advertisement genres for each of the multiple electronic devices;
generate a first score indicating the usage history of a specified user associated with the multiple electronic devices by combining at least a portion of the multiple sub-scores that correspond to one of the one or more advertisement genres;
generate a second graph relating interactions of the specified user on at least one of the multiple electronic devices with the one or more advertisement genres;
generate additional sub-scores by normalizing the interactions associated with each of the one or more advertisement genres for each of the multiple electronic devices;
generate a second score indicating the interactions of the specified user with the multiple electronic devices by combining at least a portion of the additional sub-scores that correspond to one of the one or more advertisement genres;
generate a weighted score based on the first score and the second score, the weighted score indicating whether the specified user is inclined to interact with an advertisement segment from among the one or more advertisement campaigns;
identify a specified electronic device from among the multiple electronic devices and the advertisement segment using the first features, the second features, the weighted score, and the first graph; and
provide the advertisement segment to the specified electronic device;
wherein, to identify the specified electronic device, the at least one processing device is configured to determine, using a neural network implementing a reinforced deep learning model, the specified electronic device to provide the advertisement segment, wherein the specified electronic device is associated with an output of a final hidden layer of the reinforced deep learning model exceeding a threshold value of a sigmoid function; and
wherein the at least one processing device is configured to provide a reward to the neural network after obtaining an indication that the specified user interacted with the advertisement segment provided to the specified electronic device.

9. The electronic device of claim 8, wherein:
each of the one or more advertisement campaigns includes one or more creatives;
the device data includes personal device data and shared device data, the personal device data including the usage history from at least one of the electronic devices associated with the specified user, the shared device data including the usage history from at least two of the electronic devices associated with multiple users including the specified user; and
the advertisement data includes advertisement information and target user information, the advertisement information including (i) information associated with the one or more advertisement campaigns and (ii) information associated with the one or more creatives, the target user information identifying targeted users or targeted devices for each of the one or more creatives.

10. The electronic device of claim 9, wherein the at least one processing device is further configured to:
encode the advertisement information and the target user information to generate the second features; and
generate the second graph based on the second features by aggregating the second features associated with an advertiser.

11. The electronic device of claim 8, wherein the at least one processing device is configured to identify the specified electronic device based on at least one of: a Monte Carlo analysis and a deep learning analysis with multiple instances of learning.

12. The electronic device of claim 8, wherein the at least one processing device is configured to generate the second features using at least one of: one hot encoding and word2vec encoding.

13. The electronic device of claim 8, wherein:
the at least one processing device is configured to identify the specified electronic device based on a Monte Carlo analysis; and
to perform the Monte Carlo analysis, the at least one processing device is configured to:
determine, for a first set of users and devices, a taste match score for each pairing of user and device;
determine, for each device, a ratio of taste match score for a user compared to a total of taste match scores for all devices of the first set of users and devices;
select, based on the ratio, a set of candidate devices for simulation; and
perform a Monte Carlo simulation using the selected set of candidate devices.

14. The electronic device of claim 8, wherein:
the at least one processing device is configured to identify the specified electronic device based on a deep learning analysis with multiple instances of learning; and
the reinforced deep learning model comprises an attention layer, the attention layer configured to provide weights for the first features at a device level and at a group level.

15. A non-transitory machine-readable medium containing instructions that when executed cause at least one processor to:
obtain (i) device data associated with multiple electronic devices and (ii) advertisement data associated with one or more advertisement campaigns;
identify first features and second features, the first features corresponding to the device data, the second features corresponding to the advertisement data, wherein the first features are identified using one hot encoding;
generate a first graph relating usage history of the multiple electronic devices and one or more advertisement genres;
generate multiple sub-scores by normalizing the usage history associated with each of the one or more advertisement genres for each of the multiple electronic devices;
generate a first score indicating the usage history of a specified user associated with the multiple electronic devices by combining at least a portion of the multiple sub-scores that correspond to one of the one or more advertisement genres;
generate a second graph relating interactions of the specified user on at least one of the multiple electronic devices with the one or more advertisement genres;
generate additional sub-scores by normalizing the interactions associated with each of the one or more advertisement genres for each of the multiple electronic devices;
generate a second score indicating the interactions of the specified user with the multiple electronic devices by combining at least a portion of the additional subscores that correspond to one of the one or more advertisement genres;

generate a weighted score based on the first score and the second score, the weighted score indicating whether the specified user is inclined to interact with an advertisement segment from among the one or more advertisement campaigns;

identify a specified electronic device from among the multiple electronic devices and the advertisement segment using the first features, the second features, the weighted score, and the first graph; and provide the advertisement segment to the specified electronic device;

wherein the instructions that when executed cause the at least one processor to identify the specified electronic device comprise:

instructions that when executed cause the at least one processor to determine, using a neural network implementing a reinforced deep learning model, the specified electronic device to provide the advertisement segment, wherein the specified electronic device is associated with an output of a final hidden layer of the reinforced deep learning model exceeding a threshold value of a sigmoid function; and wherein the instructions when executed cause the at least one processor to provide a reward to the neural network after obtaining an indication that the specified user interacted with the advertisement segment provided to the specified electronic device.

16. The non-transitory machine-readable medium of claim 15, wherein:

each of the one or more advertisement campaigns includes one or more creatives;

the device data includes personal device data and shared device data, the personal device data including the usage history from at least one of the electronic devices associated with the specified user, the shared device data including the usage history from at least two of the electronic devices associated with multiple users including the specified user; and the advertisement data includes advertisement information and target user information, the advertisement information including (i) information associated with the one or more advertisement campaigns and (ii) information associated with the one or more creatives, the target user information identifying targeted users or targeted devices for each of the one or more creatives.

17. The non-transitory machine-readable medium of claim 16, wherein the non-transitory machine-readable medium further contains instructions that when executed cause the at least one processor to:

encode the advertisement information and the target user information to generate the second features; and generate the second graph based on the second features by aggregating the second features associated with an advertiser.

18. The non-transitory machine-readable medium of claim 15, wherein the instructions when executed cause the at least one processor to identify the specified electronic device based on at least one of: a Monte Carlo analysis and a deep learning analysis with multiple instances of learning.

19. The non-transitory machine-readable medium of claim 15, wherein the instructions when executed cause the at least one processor to identify the specified electronic device based on a Monte Carlo analysis that comprises:

determining, for a first set of users and devices, a taste match score for each pairing of user and device;

determining, for each device, a ratio of taste match score for a user compared to a total of taste match scores for all devices of the first set of users and devices;

selecting, based on the ratio, a set of candidate devices for simulation; and performing a Monte Carlo simulation using the selected set of candidate devices.

20. The non-transitory machine-readable medium of claim 15, wherein:

the instructions when executed cause the at least one processor to identify the specified electronic device based on a deep learning analysis with multiple instances of learning; and the reinforced deep learning model comprises an attention layer, the attention layer configured to provide weights for the first features at a device level and at a group level.

* * * * *